(12) United States Patent
Watabe

(10) Patent No.: US 11,797,246 B2
(45) Date of Patent: Oct. 24, 2023

(54) IMAGE PROCESSING APPARATUS PERFORMS PAIRING WITH TERMINAL DEVICE TO ACQUIRE TRANSMISSION DESTINATION INFORMATION, INFORMATION PROCESSING SYSTEM AND METHOD FOR FURTHER ACQUIRING WORKFLOW USING TERMINAL ADDRESS

(71) Applicant: SHARP KABUSHIKI KAISHA, Sakai (JP)

(72) Inventor: Tatsuya Watabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/885,363

(22) Filed: Aug. 10, 2022

(65) Prior Publication Data
US 2023/0059023 A1    Feb. 23, 2023

(30) Foreign Application Priority Data

Aug. 18, 2021   (JP) .................................. 2021-133301

(51) Int. Cl.
  *G06F 3/12*    (2006.01)
  *H04N 1/00*    (2006.01)
  *H04N 1/333*    (2006.01)

(52) U.S. Cl.
  CPC .......... *G06F 3/1292* (2013.01); *G06F 3/1204* (2013.01); *G06F 3/1236* (2013.01); *H04N 1/00307* (2013.01); *H04N 1/33361* (2013.01); *H04N 2201/0075* (2013.01); *H04N 2201/3208* (2013.01)

(58) Field of Classification Search
  None
  See application file for complete search history.

(56) References Cited

U.S. PATENT DOCUMENTS

| 9,544,449 B1* | 1/2017 | Zehler ..................... G06F 3/121 |
| 2011/0131138 A1* | 6/2011 | Tsuchiya .............. G06Q 20/407 |
|  |  | 713/168 |
| 2017/0264758 A1* | 9/2017 | Naito .................... H04W 12/50 |
| 2018/0019926 A1* | 1/2018 | Yasui ..................... H04L 67/52 |
| 2021/0096795 A1* | 4/2021 | Chew .................... G06F 3/1204 |

FOREIGN PATENT DOCUMENTS

JP    2015-186039 A    10/2015

* cited by examiner

*Primary Examiner* — Haris Sabah

(74) *Attorney, Agent, or Firm* — ScienBiziP, P.C.

(57) ABSTRACT

An image processing apparatus includes a communicator that performs wireless communication with a terminal device; and a controller. The controller performs pairing with the terminal device, establishes wireless communication with the paired terminal device via the communicator, acquires information on a transmission destination of an image from the terminal device, disconnects the wireless communication after acquiring the information on the transmission destination, and releases the pairing with the terminal device by disconnecting the wireless communication.

13 Claims, 26 Drawing Sheets

FIG. 3

| USER NAME | FURIGANA | FAX NUMBER | E-MAIL ADDRESS |
|---|---|---|---|
| TAKAGI SEIICHI | TAKAGI SEIICHI | 03-1111-2222 | takagi@example.com |
| TAKASAKI KEIKO | TAKASAKI KEIKO | 03-1234-5678 | takasaki@example.com |
| ⋮ | ⋮ | ⋮ | ⋮ |

FIG. 4

| IDENTIFICATION INFORMATION | KEY INFORMATION |
|---|---|
| 001122334455 | *** |
| 0011223344CC | *** |
| ⋮ | ⋮ |

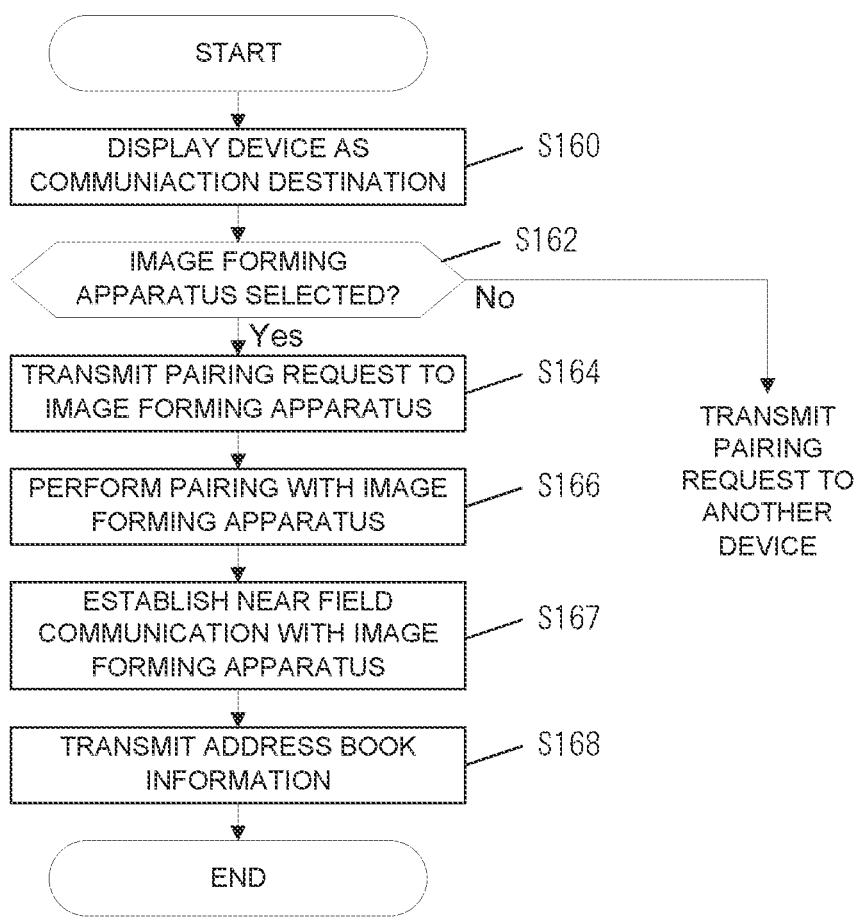

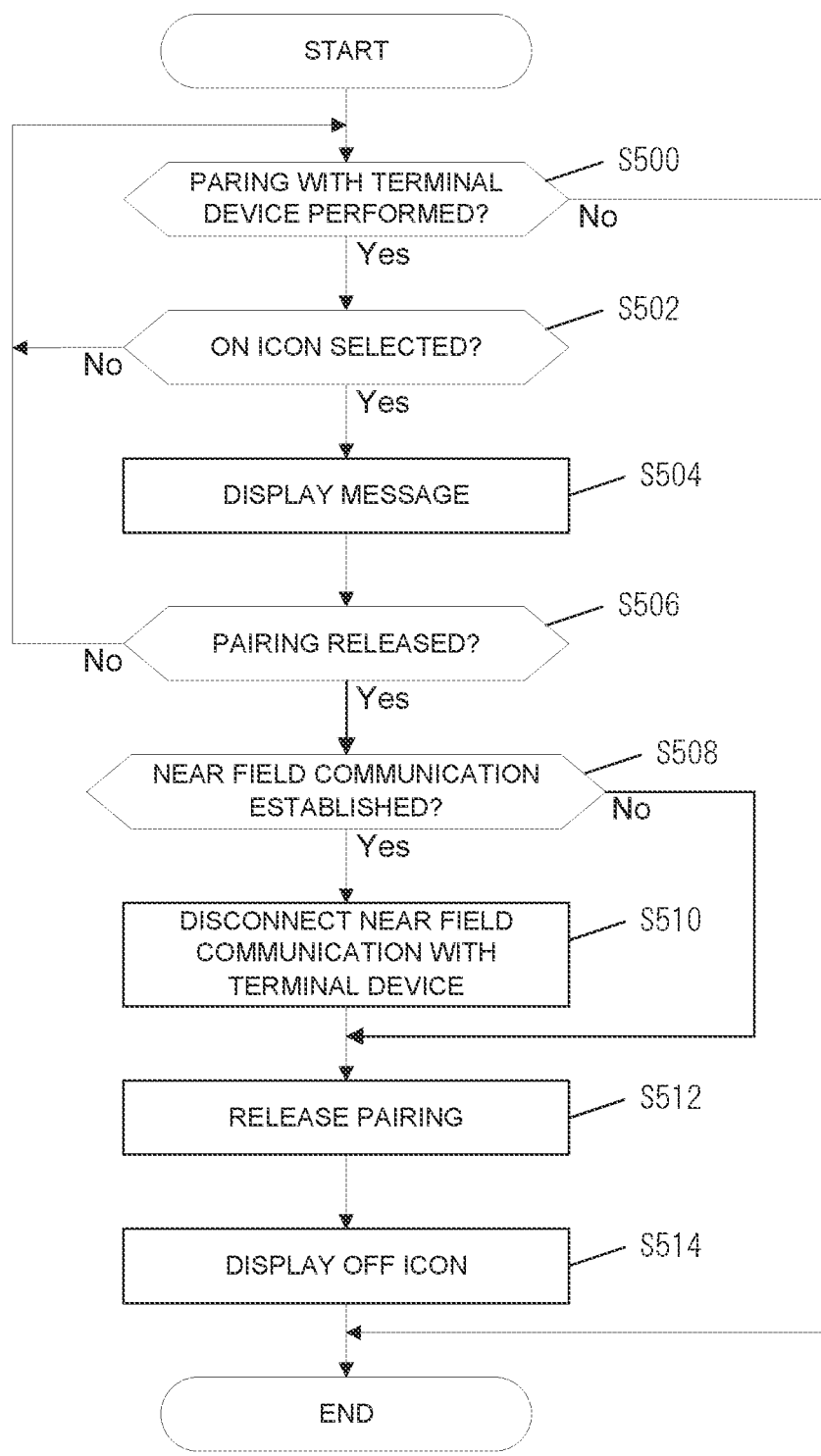

IMAGE PROCESSING APPARATUS PERFORMS PAIRING WITH TERMINAL DEVICE TO ACQUIRE TRANSMISSION DESTINATION INFORMATION, INFORMATION PROCESSING SYSTEM AND METHOD FOR FURTHER ACQUIRING WORKFLOW USING TERMINAL ADDRESS

BACKGROUND OF THE INVENTION

Field of the Invention

The present disclosure relates to an image processing apparatus and the like.

Description of the Background Art

Conventionally, apparatuses such as image forming apparatuses, and multifunction machines (MFP; multi-function peripheral/printer) having a copy function, a print function, a scanner function, a mail transmission function, and the like have been widely used.

In addition, a technique for controlling communication between an image forming apparatus and another device such as a mobile terminal has also been proposed. For example, in a wireless communication system in which an image forming apparatus and a mobile terminal communicate wirelessly, a technique has been proposed in which wireless communication between the image forming apparatus and the mobile terminal is disconnected, in a case where a predetermined condition is satisfied in a state that the wireless communication between the image forming apparatus and the mobile terminal is established. Note that, a conventional technique describes, as the predetermined condition, that a terminal device and an image forming apparatus are shifted to a power saving state, or a distance between an image forming apparatus and a mobile terminal becomes equal to or more than a predetermined distance.

As a technique for allowing an image forming apparatus to communicate with another device, there is a case in which near field communication such as Bluetooth (registered trademark) is used. Usually, a Bluetooth device exchanges a key with a peer device by performing an operation called pairing, thereby enabling communication with the peer device. Each device with which pairing has been performed is brought to a continuously communicable state while a Bluetooth function of each device is operated by holding an exchanged key (information to be used for performing communication with a counterpart device), and continuing to use the exchanged key. Therefore, in a case where communication with the same device is performed again, communication can be performed automatically without performing pairing processing.

By performing pairing with another device (e.g., a terminal device such as a smartphone), an image forming apparatus can acquire, from the other device, address book information or the like stored in the other device. Unless pairing with the other device is released, the image forming apparatus remains in a communicable state with the other device, even when address book information of the other device is not acquired from the image forming apparatus. Herein, there is an issue that, regardless that a user of the other device is not operating the image forming apparatus, another user is able to acquire address book information from the other device via the image forming apparatus by operating the image forming apparatus. The issue as described above has not been considered in the conventional technique.

In view of the above-described issue, an object of the present disclosure is to provide an image processing apparatus and the like that releases pairing with a terminal device, after acquiring predetermined information from the paired terminal device.

SUMMARY OF THE INVENTION

In order to solve the above-described issue, an image processing apparatus according to the present disclosure includes a communicator that performs wireless communication with a terminal device; and a controller. The controller performs pairing with the terminal device, establishes wireless communication with the paired terminal device via the communicator, acquires information on a transmission destination of an image from the terminal device, disconnects the wireless communication after acquiring the information on the transmission destination, and releases the pairing with the terminal device by disconnecting the wireless communication.

A system according to the present disclosure is a system including a terminal device and an image processing apparatus. The terminal device transmits information on a transmission destination of an image to the image processing apparatus by performing wireless communication with the image processing apparatus. The image processing apparatus performs pairing with the terminal device, establishes wireless communication with the paired terminal device, acquires the information on the transmission destination from the terminal device, disconnects the wireless communication after acquiring the information on the transmission destination, and releases the pairing with the terminal device by disconnecting the wireless communication.

A control method according to the present disclosure is a control method for an image processing apparatus. The control method includes: pairing with a terminal device; establishing wireless communication with the paired terminal device; acquiring information on a transmission destination of an image from the terminal device; disconnecting the wireless communication after acquiring the information on the transmission destination; and releasing the pairing with the terminal device by disconnecting the wireless communication.

According to the present disclosure, it is possible to provide an image processing apparatus and the like that releases pairing with a terminal device after acquiring predetermined information from the paired terminal device.

BRIEF DESCRIPTION OF THE DRAWINGS

FIG. 3 is a diagram illustrating a data structure of address book information stored in the image processing apparatus according to the first embodiment.

FIG. 4 is a diagram illustrating a data structure of pairing information stored in the image processing apparatus according to the first embodiment.

FIG. 7 is a flowchart illustrating a flow of processing to be performed by the terminal device according to the first embodiment.

FIG. 18 is a flowchart illustrating a flow of processing to be performed by an image processing apparatus according to a fifth embodiment.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the disclosure described in the claims is not limited to the following description.

1. First Embodiment

1.1 Overall Configuration

Figure 1:
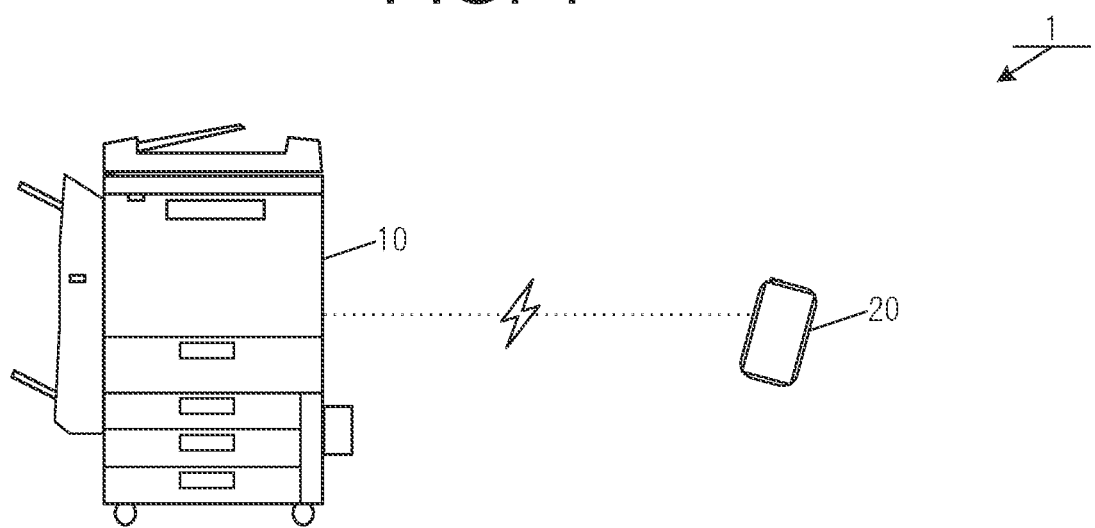
FIG. 1 is a diagram illustrating an overall configuration of a system according to a first embodiment.

Referring to FIG. 1, a system 1 according to the present embodiment is described. As illustrated in FIG. 1, the system 1 according to the present embodiment is configured to include an image processing apparatus 10 and a terminal device 20. It is also assumed that the image processing apparatus 10 and the terminal device 20 are capable of performing near field communication.

The image processing apparatus 10 is an apparatus having a copy function, a print function, a scanner function, a mail function, and the like, and is an apparatus generally called a digital multifunction machine (MFP; Multi-Function Peripheral/Printer). Note that, the image processing apparatus 10 may be an image forming apparatus including a means for forming an image on recording paper such as paper or an OHP film by using a means such as an electrophotographic method.

The terminal device 20 is an information processing device carried by a user. The terminal device 20 is a device such as, for example, a smartphone or a tablet device. Note that, the terminal device 20 may be a device such as a smartwatch, a personal computer (PC), or a personal digital assistant (PDA).

1.2 Functional Configuration

1.2.1 Image Processing Apparatus

Figure 2:
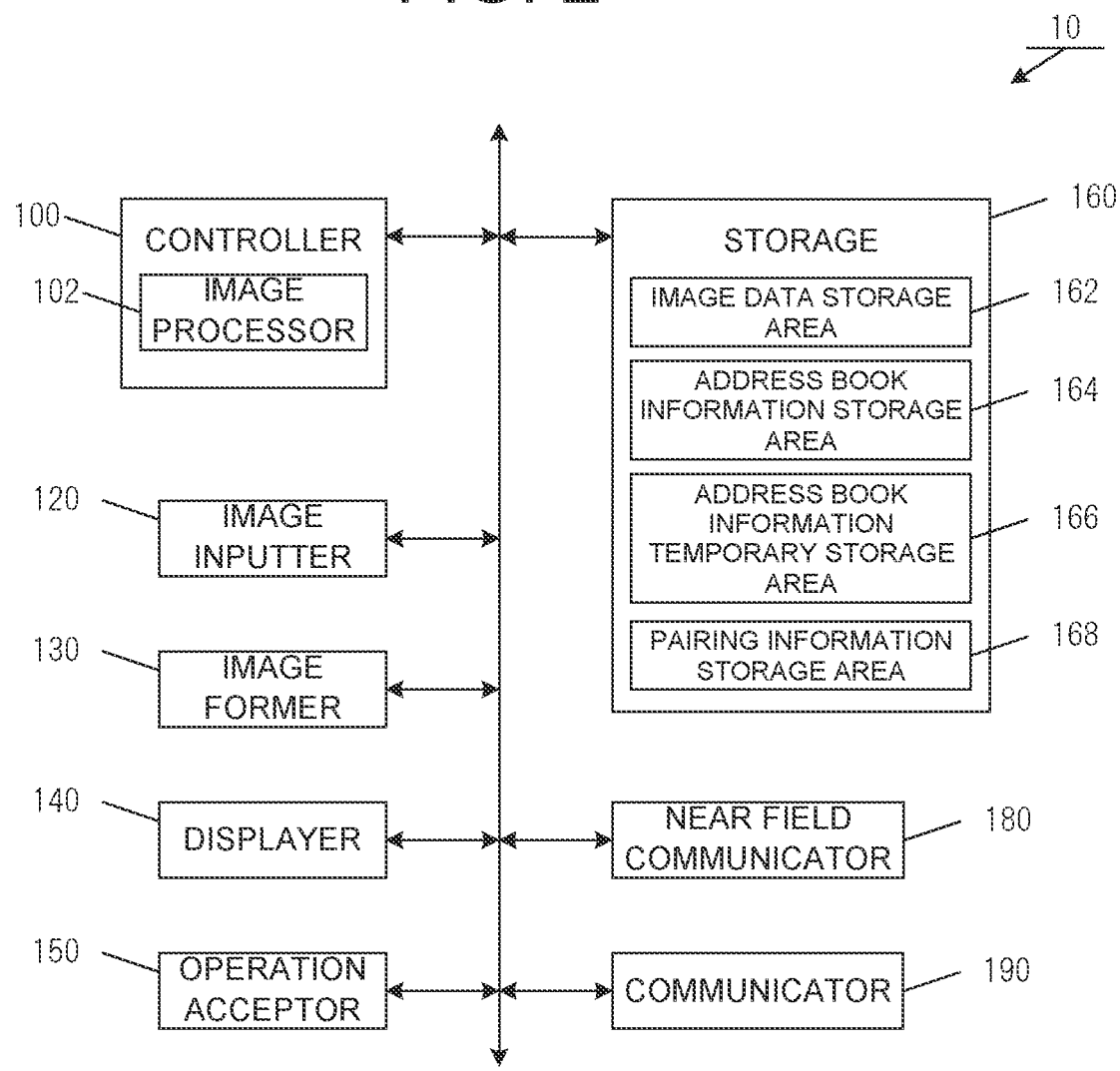
FIG. 2 is a diagram illustrating a functional configuration of an image processing apparatus according to the first embodiment.

A configuration of the image processing apparatus 10 according to the present embodiment is described with reference to FIG. 2. As illustrated in FIG. 2, the image processing apparatus 10 is configured to include a controller 100, an image inputter 120, an image former 130, a displayer 140, an operation acceptor 150, a storage 160, a near field communicator 180, and a communicator 190.

The controller 100 controls the entirety of the image processing apparatus 10. The controller 100 achieves various functions by reading and executing various programs stored in the storage 160, and is configured of one or more arithmetic devices (e.g., central processing units (CPUs)).

The controller 100 functions as an image processor 102 by executing a program stored in the storage 160. The image processor 102 performs processing for each type of an image. For example, the image processor 102 performs sharpening processing and gradation conversion processing for an image read by the image inputter 120.

The image inputter 120 reads a document, and inputs data of a read image. For example, the image inputter 120 is configured of a scan device or the like including a device that converts optical information of a contact image sensor (CIS), a charge coupled device (CCD), or the like into electrical signals, and reads a document placed on a loading table of the image processing apparatus 10. Note that, the image inputter 120 may be configured of an interface (terminal) for reading an image stored in a storage medium such as a universal serial bus (USB) memory, and may input an image stored in the storage medium. Further, the image inputter 120 may input an image received via the communicator 190.

The image former 130 forms (prints) an image on a recording medium such as recording paper. The image former 130 is configured of, for example, a laser printer or the like using an electrophotographic method.

The displayer 140 displays various pieces of information. The displayer 140 is configured of a display device such as, for example, a liquid crystal display (LCD), an organic electro-luminescence (EL) display, or a micro LED display.

The operation acceptor 150 accepts an operation of a user using the image processing apparatus 10. The operation acceptor 150 is configured of hardware keys (physical keys, a numeric keypad), and an input device such as a touch sensor. A method of detecting an input by a touch sensor may be a general detection method such as, for example, a resistive film method, an infrared method, an electromagnetic induction method, or a capacitance method. Note that, the image processing apparatus 10 may include a touch panel in which the displayer 140 and the operation acceptor 150 are formed into one piece.

The storage 160 stores various programs necessary for an operation of the image processing apparatus 10, and various pieces of data. The storage 160 is configured of a storage device such as, for example, a solid state drive (SSD) being a semiconductor memory, or a hard disk drive (HDD).

The storage 160 secures, as storage areas, an image data storage area 162, an address book information storage area 164, an address book information temporary storage area 166, and a pairing information storage area 168.

The image data storage area 162 stores image data of an image input by the image inputter 120. The image data may be, for example, a file in which an image to be formed by the image former 130 is represented, or may be data (print data) representing an image to be formed by the image former 130.

The address book information storage area 164 stores information (address book information) concerning user's contact information (e.g., address book information such as phone numbers and e-mail addresses). The address book information stored in the image processing apparatus 10 is generally data indicated by a function called an address book or a phone book. In the present embodiment, the image processing apparatus 10 uses, as information (address) to which an image is transmitted, user's contact information included in address book information.

As illustrated in FIG. 3, address book information stored in the address book information storage area 164 includes a name of a user (e.g., "Takagi Seiichi"), furigana of the user (e.g., "Takagi Seiichi"), a facsimile (fax) number of the user (e.g., "03-1111-2222"), and an e-mail address of the user (e.g., "takagi@example.com").

A fax number and an e-mail address included in address book information stored in the image processing apparatus 10 are user's contact information, and are used as information (address) to which an image is transmitted. The address book information stored in the image processing apparatus 10 may include a plurality of e-mail addresses and fax numbers. In addition to the above-described information, the address book information stored in the image processing apparatus 10 may also include information such as addresses, company names, telephone numbers, affiliated department names, categories, and memos.

The address book information temporary storage area 166 temporarily stores address book information acquired from another device (e.g., the terminal device 20). A data structure of address book information stored in the address book information temporary storage area 166 is based on a data structure of address book information stored in the other device.

The pairing information storage area 168 stores information concerning pairing (pairing information), as information concerning connection (connection information) to establish communication (connection) with the terminal device 20. As illustrated in FIG. 4, the pairing information includes identification information (e.g., "001122334455") of a device with which pairing has been performed, and key information (e.g., "***") that has been exchanged by the device.

The identification information of a paired device is, for example, an address (Bluetooth Device Address, BD address) that is used for identifying a device compatible with Bluetooth.

Further, the key information is information for use in performing communication again with a device identified by identification information, and is key information such as, for example, a link key. Note that, in a case where information (information to be exchanged when pairing is performed) for use in performing communication again with a device identified by identification information is information other than key information, the information other than the key information may be stored as pairing information.

In this way, information for performing communication with a paired device is stored as pairing information. Therefore, information according to a near field communication technique for use is stored as pairing information. For example, when a near field communication technique to be used by the image processing apparatus 10 is Bluetooth low energy (BLE), long term key (LTK) is stored as key information. Note that, information other than the above-described information may be stored as pairing information.

The near field communicator 180 performs wireless communication using a near field communication method with another device located in the vicinity of the image processing apparatus 10. The near field communicator 180 is configured of, for example, a communication device including an antenna. A near field communication method to be used by the near field communicator 180 may be any method, as far as the method is a wireless communication method to be generally used in near field communication such as Bluetooth, near field communication (NFC), or ZigBee (registered trademark). Further, near field communication may be achieved by Wi-Fi (registered trademark). Note that, in the present embodiment, description is made based on a premise that a near field communication method to be used by the near field communicator 180 is Bluetooth.

The communicator 190 performs communication with an external device via a LAN or a WAN. The communicator 190 is configured of, for example, a communication device such as a network interface card (NIC) to be used in a wired/wireless local area network (LAN), or a communication module. Further, the communicator 190 is connectable to a communication network such as a public line network, a LAN, or the Internet, and may be configured in such a way that image data can be transmitted and received to and from an external device via a communication network by a communication method such as facsimile or an e-mail.

1.2.2 Terminal Device

Figure 5:
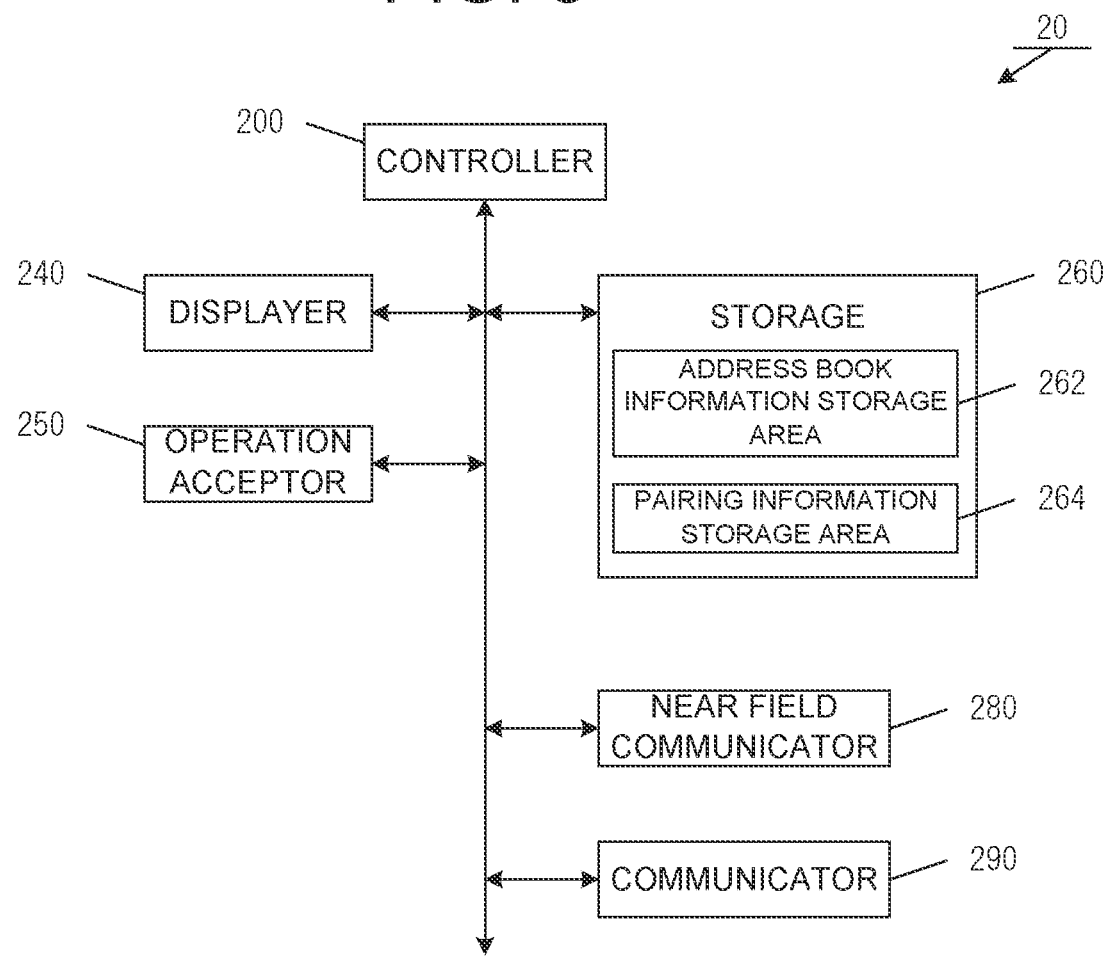
FIG. 5 is a diagram illustrating a functional configuration of a terminal device according to the first embodiment.

A configuration of the terminal device 20 according to the present embodiment is described with reference to FIG. 5. As illustrated in FIG. 5, the terminal device 20 is configured to include a controller 200, a displayer 240, an operation acceptor 250, a storage 260, a near field communicator 280, and a communicator 290.

The controller 200 controls the entirety of the terminal device 20. The controller 200 achieves various functions by reading and executing various programs stored in the storage 260, and is configured of one or more arithmetic devices (e.g., CPUs).

The displayer 240 displays various pieces of information. The displayer 240 is configured of a display device such as, for example, an LCD, an organic EL display, or a micro LED display.

The operation acceptor 250 accepts an operation of a user using the terminal device 20. The operation acceptor 250 is configured of an input device such as a touch sensor. Note that, the terminal device 20 may include a touch panel in which the displayer 240 and the operation acceptor 250 are formed into one piece.

The storage 260 stores various programs necessary for an operation of the terminal device 20, and various pieces of data. The storage 260 is configured of a storage device such as, for example, an SSD being a semiconductor memory, or an HDD.

The storage 260 secures, as storage areas, an address book information storage area 262, and a pairing information storage area 264.

The address book information storage area 262 stores information (address book information) concerning user's contact information (e.g., telephone numbers, e-mail addresses, and the like). The address book information stored in the terminal device 20 is information to be displayed by a function generally called an address book or a phone book. Note that, the address book information stored in the terminal device 20 is also referred to as a mobile address book.

The address book information stored in the address book information storage area 262 includes information similar to address book information stored in the image processing apparatus 10, for example, as illustrated in FIG. 3. Note that, in a case where the terminal device 20 is a device having a telephone function, such as a smartphone, address book information stored in the terminal device 20 may include address information concerning a telephone function, such as telephone numbers, and short message service (SMS) addresses. Note that, the address book information stored in the terminal device 20 may include a plurality of e-mail addresses and fax numbers. In addition to the above-described information, the address book information stored in the terminal device 20 may also include information such as addresses, company names, telephone numbers, affiliated department names, categories, and memos.

The pairing information storage area 264 stores information concerning pairing (pairing information), as information concerning connection (connection information) to establish communication (connection) with the image processing apparatus 10. The pairing information stored in the pairing information storage area 264 includes, for example, information similar to pairing information stored in the image processing apparatus 10, as illustrated in FIG. 4.

The near field communicator 280 performs wireless communication with another device located in the vicinity of the terminal device 20. The near field communicator 280 is configured of, for example, a communication device including an antenna. A wireless communication method to be used by the near field communicator 280 may be any method, as far as the method is a wireless communication method to be generally used for near field communication such as Bluetooth, an NFC, ZigBee, and Wi-Fi. Note that, the present embodiment is described based on a premise that a near field communication method to be used by the near field communicator 280 is Bluetooth.

The communicator 290 performs communication with an external device. The communicator 290 is configured of, for example, a NIC to be used for a wired/wireless LAN, and a communication module connectable to Long-Term Evolution (LTE)/LTE-Advanced (LTE-A)/License-Assisted Access (LAA) using LTE)/5G line.

1.3 Flow of Processing

1.3.1 Image Processing Apparatus

Figure 6:
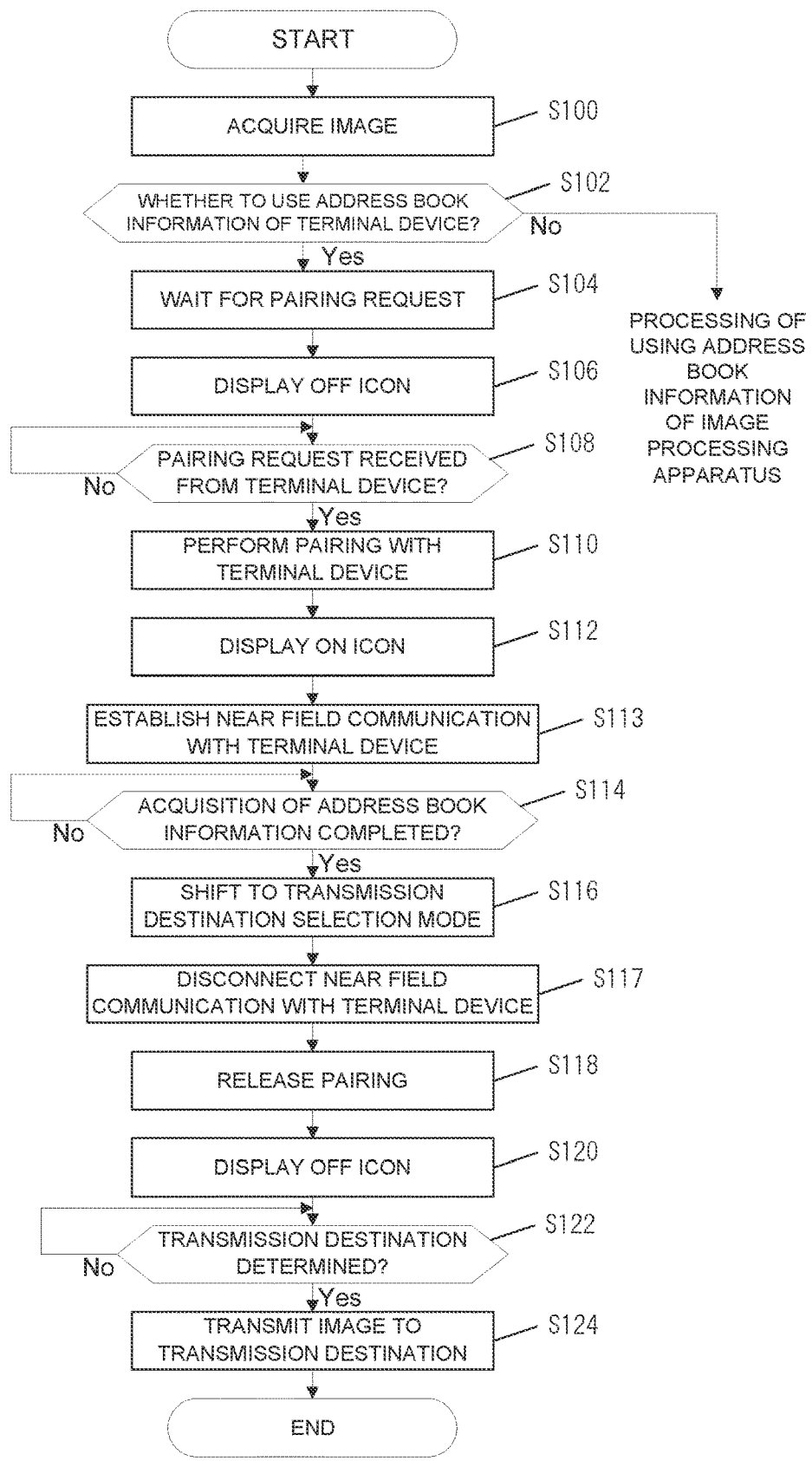
FIG. 6 is a flowchart illustrating a flow of processing to be performed by the image processing apparatus according to the first embodiment.

Referring to FIG. 6, a flow of image transmission processing to be performed by the image processing apparatus 10 is described. The image transmission processing is processing to be performed when an image transmission function is selected by the user. The image transmission function is a function of transmitting an image (e.g., an image input by reading a document) input by the image inputter 120 by using an e-mail (scan to email function), or a function of transmitting by facsimile. Note that, an operation mode of the image processing apparatus 10 when the image transmission function is achieved is referred to as an image transmission mode or a transmission mode.

The processing illustrated in FIG. 6 is performed by causing the controller 100 to read a program stored in the storage 160. Also, it is assumed that, before performing the processing illustrated in FIG. 6, the image processing apparatus 10 is in a state that a function (Bluetooth function) of performing communication by Bluetooth is usable by system setting or the like.

First, the controller 100 acquires an image (step S100). For example, the controller 100 reads one or more documents by controlling the image inputter 120, and acquires an image (image data) by generating image data based on an RGB signal to be input from the image inputter 120. Note that, the controller 100 may store acquired image data in the image data storage area 162.

Subsequently, the controller 100 determines whether to use address book information stored in the terminal device 20 (step S102). For example, the controller 100 displays, on the displayer 140, a "mobile address book" button indicating that address book information stored in an external device is used. In a case where the "mobile address book" button is selected by the user, the controller 100 determines that address book information stored in the terminal device 20 is used.

In a case where the controller 100 uses address book information stored in the terminal device 20, the controller 100 allows an external device to recognize the image processing apparatus 10 by turning Bluetooth on, and brings the image processing apparatus 10 into a pairing request wait state (step S102; Yes→step S104). This allows the image processing apparatus 10 to display identification information thereof on a display screen of the external device. Turning Bluetooth on means, for example, starting processing of transmitting an advertising packet, or processing of automatically establishing communication (connection) with a paired device. At this occasion, the controller 100 may transmit, to the terminal device 20 via the near field communicator 180, information of the image processing apparatus 10 (e.g., a name of a Bluetooth device of the image processing apparatus 10, and identification information of a BD address and the like). The controller 100 may display, on the displayer 140, the name of a Bluetooth device of the image processing apparatus 10, or a message indicating that the image processing apparatus 10 is waiting for a pairing request.

In addition, the controller 100 displays, on the displayer 140, an OFF icon (second identification indication) (step S106). The OFF icon is an identification indication indicating that pairing with an external device (e.g., the terminal device 20) has been released, and is an identification indication different from an ON icon to be described later. The state that pairing with the image processing apparatus 10 is released means a state that the image processing apparatus 10 cannot automatically perform near field communication with an external device. The state that pairing with the image processing apparatus 10 is released is, for example, equivalent to a case in which the image processing apparatus 10 does not store information for performing near field communication with another device, and a paired external device is not present. For example, in a case where a paired external device is not present, the controller 100 controls to display an OFF icon on the displayer 140.

Subsequently, the controller 100 determines whether a pairing request is received from the terminal device 20 via the near field communicator 180 (step S108). The pairing request is a signal or information indicating pairing is requested. In a case where the controller 100 does not receive a pairing request from the terminal device 20, the controller 100 repeatedly performs processing in step S108 (step S108; No).

On the other hand, in a case where the controller 100 receives a Bluetooth pairing request from the terminal device 20, the controller 100 performs Bluetooth pairing with the terminal device 20 (step S108; Yes→step S110). For example, the controller 100 exchanges keys with the terminal device 20, and stores, in the pairing information storage area 168, pairing information including information (key information) on the exchanged keys, and identification information of the terminal device 20. In this way, in the present embodiment, the controller 100 performs pairing with the terminal device 20 by storing pairing information of the terminal device 20 (so-called performing bonding). This brings the image processing apparatus 10 and the terminal device 20 into a pairing state. Specifically, by causing the image processing apparatus 10 to store connection information on the terminal device 20 with which the image processing apparatus 10 can communicate afterwards, the terminal device 20 is registered as a connectable partner.

Subsequently, the controller 100 completes pairing with the terminal device 20, and when the controller 100 is brought to a communicable (connectable) state using Bluetooth, the controller 100 displays, on the displayer 140, an ON icon (first identification indication) (step S112). The ON icon is an identification indication indicating that pairing with an external device (e.g., the terminal device 20) is performed. For example, in a case where one or more external devices with which pairing is performed are present, the controller 100 controls to display an ON icon on the displayer 140.

Subsequently, the controller 100 establishes near field communication with the paired terminal device 20 in step S110 (step S113), and starts acquiring (reading) address book information from the terminal device 20. Note that, the controller 100 may establish near field communication with the terminal device 20 via the near field communicator 180, based on pairing information (connection information) with the terminal device 20. Further, the controller 100 determines whether acquisition of address book information has been completed (step S114). Note that, the controller 100 may acquire (read) address book information from the terminal device 20 through communication (PBAP communication) using a phone book access profile (PBAP), for example. This allows the user to transmit address book information from the terminal device 20 to the image processing apparatus 10 without installing any special application in the terminal device 20. The controller 100 may also use address book information acquired from the terminal device 20, as information on a transmission destination of an image.

Note that, the controller 100 may determine that acquisition of address book information has been completed in the following cases.
(1) A case where a signal or information indicating that all pieces of address book information have been transmitted from the terminal device 20.
(2) A case where the number of pieces of address book information to be transmitted is notified in advance from the terminal device 20, and the notified number of pieces of address book information are received.
(3) A case where communication with the terminal device 20 has not been performed for a predetermined period of time (a case where a timeout has occurred).

In a case where acquisition of address book information has not been completed, the controller 100 repeatedly performs processing in step S114 (step S114; No). Note that, the controller 100 stores address book information received from the terminal device 20 in the address book information temporary storage area 166.

On the other hand, in a case where acquisition of address book information has been completed, the controller 100 shifts the operation mode of the image processing apparatus 10 to a transmission destination selection mode (step S114; Yes→step S116). The transmission destination selection mode is an operation mode for allowing the user to select a transmission destination of an image acquired in step S100. For example, the controller 100 displays, on the displayer 140, a screen (transmission destination selection screen) on the transmission destination selection mode.

The transmission destination selection screen is a screen on which an address (an e-mail address or a fax number) indicating a transmission destination of an image, and a user name associated with the address are displayed in the form of a list or the like, based on address book information stored in the address book information temporary storage area 166. Specifically, the transmission destination selection screen is a screen for selecting address book information stored in the terminal device 20. The transmission destination selection screen provides a user interface for allowing the user to select one or more addresses, determine the selected address, and perform image transmission.

Subsequently, the controller 100 disconnects near field communication with the terminal device 20 (step S117). Further, the controller 100 releases Bluetooth pairing with the terminal device 20 (step S118). For example, the controller 100 deletes pairing information stored in the pairing information storage area 168 in step S110. By deleting pairing information with the terminal device 20, the controller 100 is disable to communicate (connect) with the terminal device 20 unless pairing with the terminal device 20 is performed again. Furthermore, after pairing with the terminal device 20 is released, the controller 100 controls to display an OFF icon on the displayer 140 (step S120). Consequently, when acquisition of address book information from the terminal device 20 has been completed, the controller 100 can release pairing by disconnecting communication with the terminal device 20.

Herein, the image processing apparatus 10 may delete pairing by detecting that communication with the terminal device 20 is connected. The image processing apparatus 10 may also release pairing in conjunction with disconnecting communication with the terminal device 20. The image processing apparatus 10 may also disconnect communication in conjunction with deleting pairing with the terminal device 20.

In the image processing apparatus 10, releasing pairing may also mean that deleting the terminal device 20 that has been registered to be communicable. For example, the image processing apparatus 10 may have connection information on the communicable terminal device 20, and by deleting the connection information, connection may not be established unless the connection information is stored again afterwards.

Subsequently, the controller 100 determines whether a transmission destination (destination) of an image has been determined (step S122). For example, the controller 100 determines that a transmission destination of an image has been determined, in a case where a user has performed an operation of determining an address serving as a transmission destination of an image, or an operation of performing transmission of an image on a transmission destination selection screen. In a case where a transmission destination of an image is not determined, the controller 100 repeatedly performs processing in step S122 (step S122; No).

On the other hand, in a case where a transmission destination of an image is determined, the controller 100 transmits, to a predetermined device via the communicator 190, an image acquired in step S100, based on a transmission destination (address) determined in step S122 (step S122; Yes→step S124). For example, in a case where an e-mail address is selected as a transmission destination of an image, the controller 100 transmits, to a mail server, an e-mail with the image attached. Also, in a case where a fax number is selected as a transmission destination of an image, the controller 100 transmits the image to a transmission destination device via a public line network, or transmit the image to a transmission destination device by using the Internet FAX technology. In addition, the controller 100 may delete address book information stored in the address book information temporary storage area 166 when processing of transmitting an image to a transmission destination is completed.

Note that, in step S102, in a case where the controller 100 does not use address book information stored in the terminal device 20, the controller 100 performs processing of transmitting an image by using address book information stored in the address book information storage area 164 of the image processing apparatus 10 (step S102; No).

1.3.2 Terminal Device

Referring to FIG. 7, a flow of processing of the terminal device 20 is described. Processing illustrated in FIG. 7 is performed by causing the controller 200 to read a program stored in the storage 260, in a case or the like where an operation of displaying a setting screen for near field communication (Bluetooth) is performed by the user. It is assumed that, before processing illustrated in FIG. 7 is performed, the terminal device 20 is in a state that a Bluetooth function is usable.

First, the controller 200 displays a communication destination device (step S160). For example, the controller 200 searches a Bluetooth device. At this occasion, information on a Bluetooth device is received via the near field communicator 280, and a name of the Bluetooth device included in the received information is listed on the displayer 240, as the communication destination device.

Subsequently, in a case where the image processing apparatus 10 is selected as the communication destination device, the controller 200 transmits a Bluetooth pairing request to the image processing apparatus 10 via the near field communicator 280 (performs a Bluetooth pairing request) (step S162; Yes→step S164).

Subsequently, the controller 200 performs Bluetooth pairing with the image processing apparatus 10 (step S166). For example, as processing in step S166, the controller 200 stores, in the pairing information storage area 264, pairing information concerning the image processing apparatus 10, which is a communication destination device similarly to step S110 in FIG. 6.

Subsequently, the controller 200 establishes near field communication with the image processing apparatus 10 (step S167). Further, the controller 200 acquires address book information stored in the address book information storage area 262, and transmits the address book information to the image processing apparatus 10 via the near field communicator 280 (step S168). Note that, in a case where all pieces of address book information stored in the address book information storage area 262 have been transmitted, the controller 200 may transmit a signal or information indicating that all the pieces of address book information have been transmitted to the image processing apparatus 10 via the near field communicator 280. Further, before transmitting address book information, the controller 200 may transmit the number of pieces of address book information to be transmitted to the image processing apparatus 10 via the near field communicator 280. In this way, the controller 200 transmits, to the image processing apparatus 10, information for use in determining that transmission of address book information has been completed.

Note that, the order of steps in FIGS. 6 and 7 may be changed, or some steps may be omitted, as far as there is no inconsistency. For example, in FIG. 6, after pairing is released, and an OFF icon is displayed, the controller 100 may shift to a transmission destination selection mode (step S118→step S120→step S116).

1.4 Operation Example

Figure 8A:
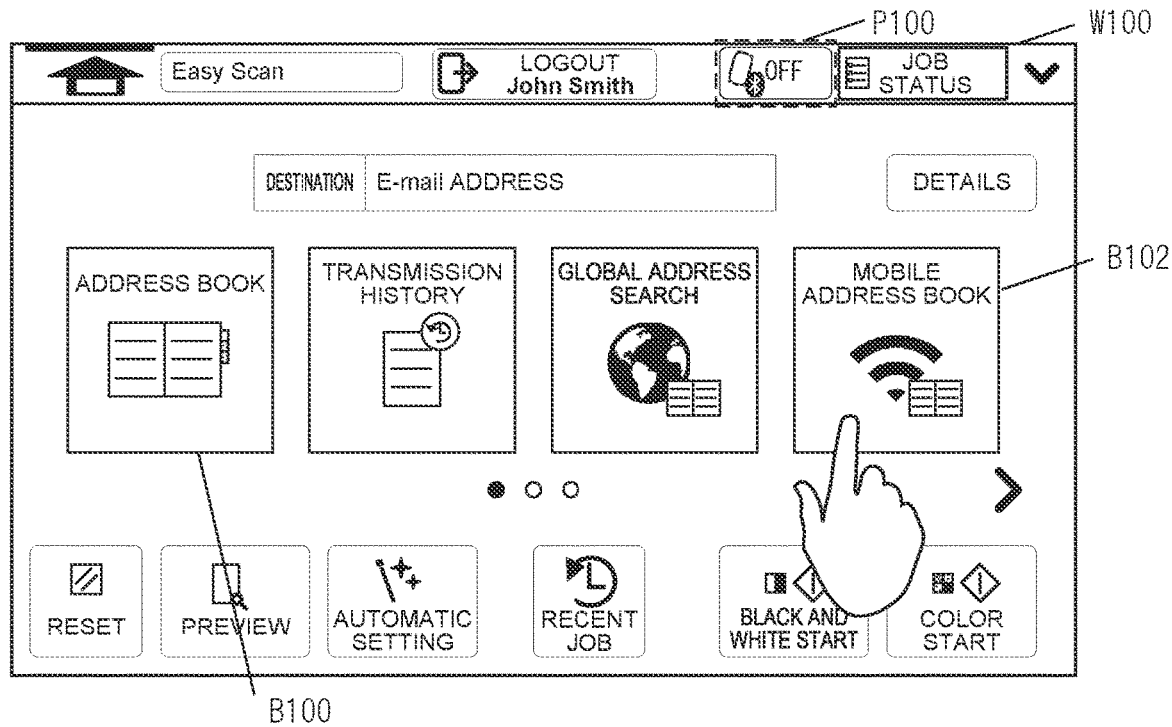
FIGS. 8A and 8B are diagrams illustrating an operation example according to the first embodiment.

Next, an operation example according to the present embodiment is described with reference to FIGS. 8A to 10B. FIG. 8A is a diagram illustrating an example of a display screen W100 to be displayed on the displayer 140, in a case where a transmission mode (easy scan mode) is selected in the image processing apparatus 10.

The display screen W100 includes buttons B100 and the like through which a transmission destination of an acquired image is selected from among address book information stored in the image processing apparatus 10. Herein, the display screen W100 includes a button B102 for selecting a transmission destination of an image from among address book information stored in an external device such as the terminal device 20. The button B102 is a "mobile address book" button indicating that address book information stored in an external device is used. By selecting the button B102, the user can allow address book information stored in the terminal device 20 to be used in the image processing apparatus 10.

Note that, when the display screen W100 is displayed, the image processing apparatus 10 does not perform pairing with the terminal device 20. Therefore, an OFF icon P100 is displayed on the display screen W100.

Figure 8B:
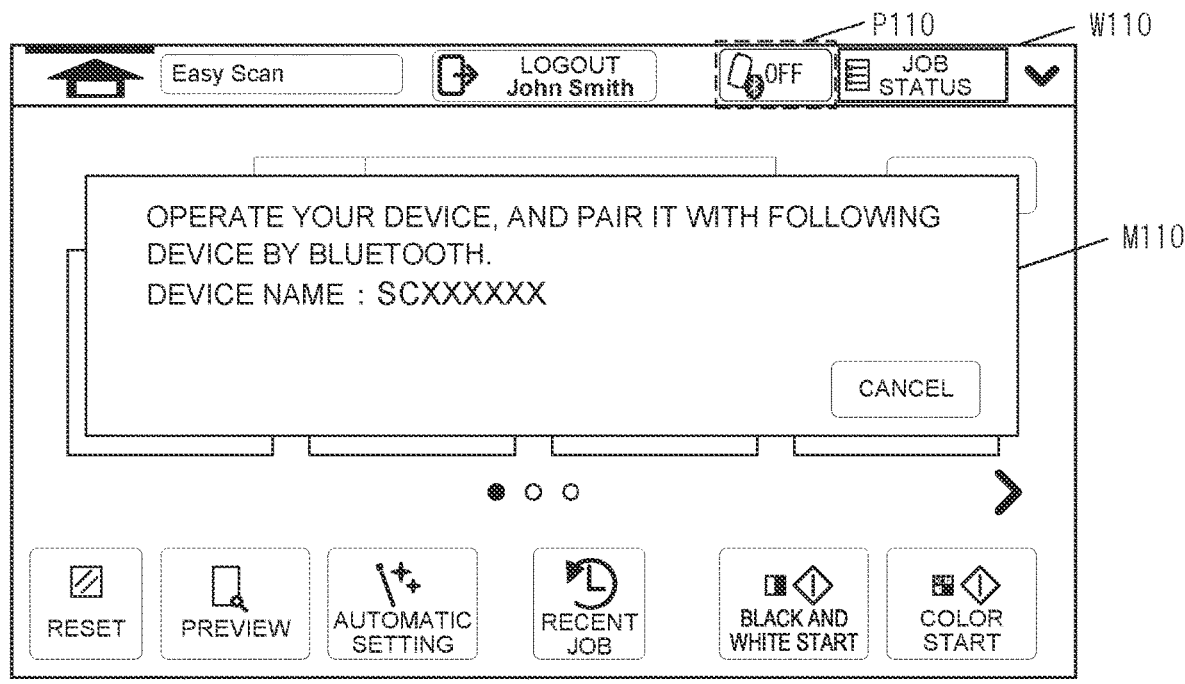

FIG. 8B is a diagram illustrating an example of a display screen W110 to be displayed on the displayer 140, in a case where the button B102 is selected on the display screen W100. A name of a Bluetooth device of the image processing apparatus 10, and a message M110 indicating that the image processing apparatus 10 is waiting for a pairing request are displayed on the display screen W110. Also at this point of time, the image processing apparatus 10 has not yet performed pairing with the terminal device 20. Therefore, an OFF icon P110 is displayed on the display screen W110.

Figure 9A:
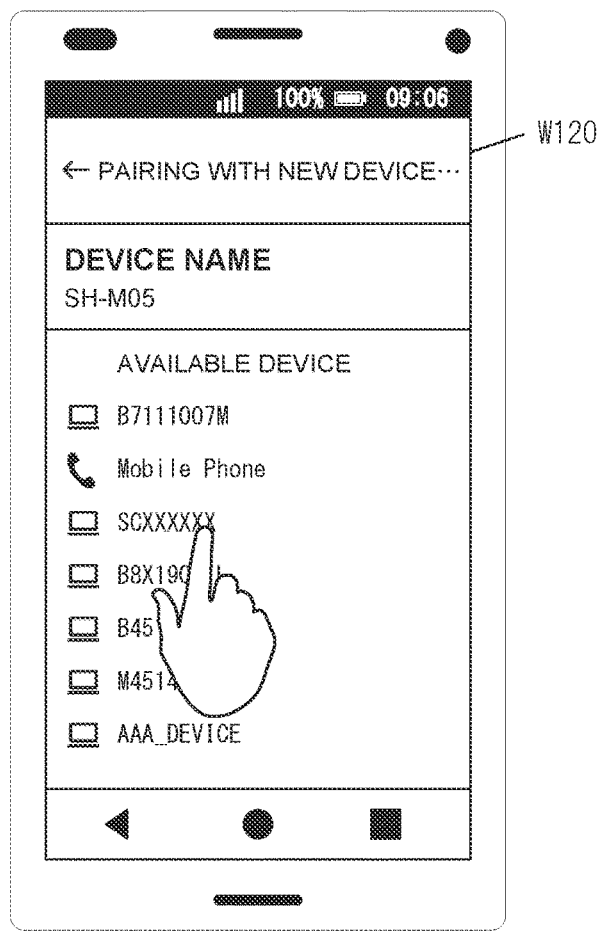
FIGS. 9A and 9B are diagrams illustrating an operation example according to the first embodiment.

FIG. 9A is a diagram illustrating an example of a display screen W120 on which names of Bluetooth devices, which are displayed on the displayer 240 of the terminal device 20, are listed. The user can allow the image processing apparatus 10 and the terminal device 20 to perform pairing for communication by selecting, from the Bluetooth device names displayed on the display screen W200, a Bluetooth device name of the image processing apparatus 10 included in the message M110 in FIG. 8B.

Figure 9B:
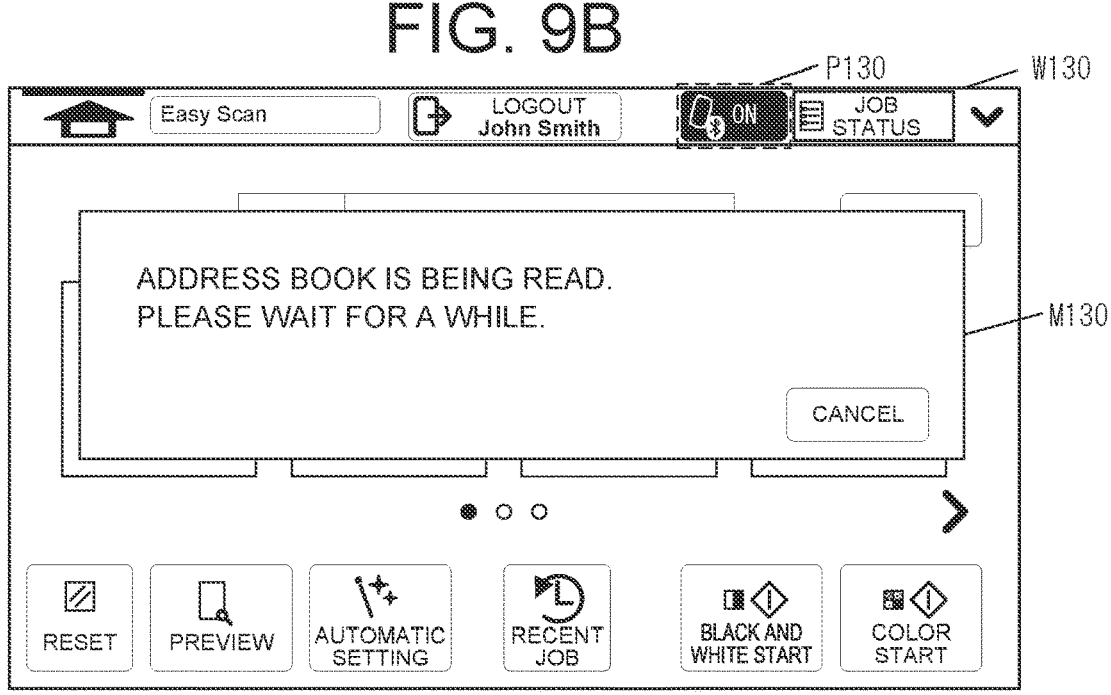

FIG. 9B is a diagram illustrating an example of a display screen W130 to be displayed on the displayer 140 of the image processing apparatus 10, when address book information is received from the terminal device 20. A message M130 indicating that address book information stored in the terminal device 20 is being read is displayed on the display screen W130.

In some cases, the user may be asked for permission to access address book information in the terminal device 20. In such a case, a message M130 may include a message indicating that the user is asked for permission to access address book information in the terminal device 20 (e.g., please allow access to contact information of your device).

Further, when the display screen W130 is displayed, since the image processing apparatus 10 is performing pairing with the terminal device 20, an ON icon P130 is displayed on the display screen W130.

Figure 10A:
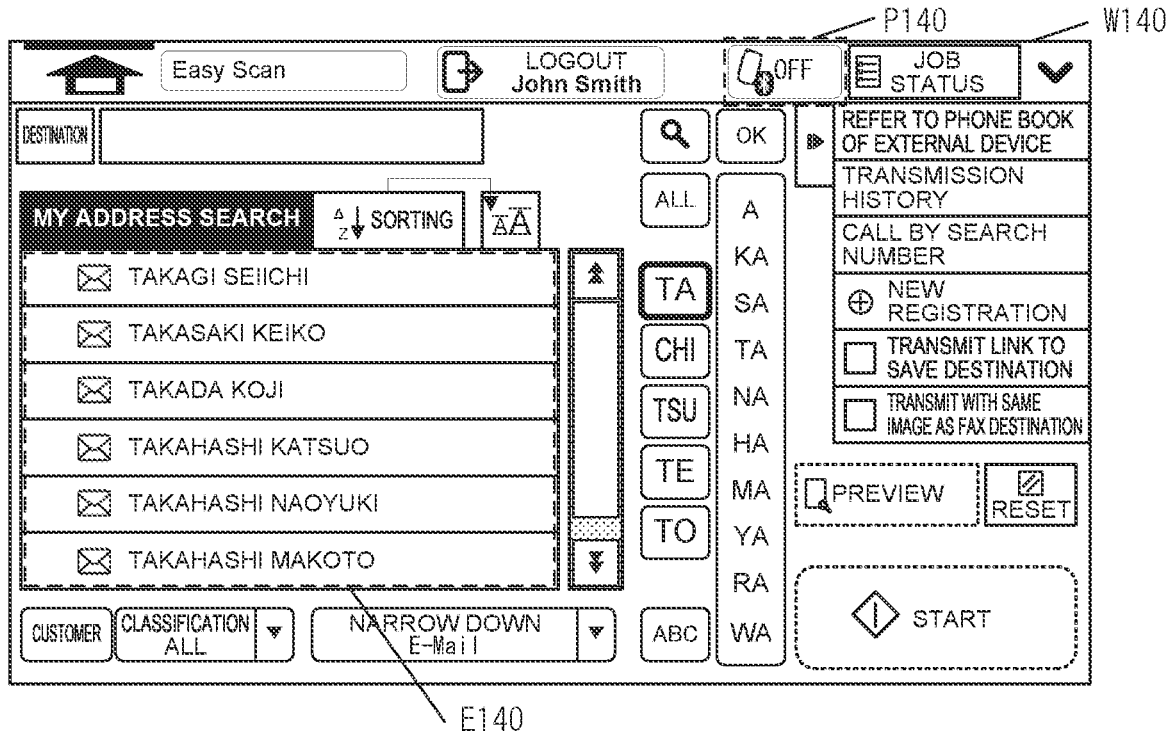
FIGS. 10A and 10B are diagrams illustrating an operation example according to the first embodiment.

FIG. 10A is a diagram illustrating an example of a display screen W140 (transmission destination selection screen) to be displayed on the displayer 140 after the image processing apparatus 10 reads address book information stored in the terminal device 20. In the present embodiment, pairing between the image processing apparatus 10 and the terminal device 20 is released when reading of address book information stored in the terminal device 20 is completed. Therefore, an OFF icon P140 is displayed on the display screen W140. This allows the user to recognize that pairing between the image processing apparatus 10 and the terminal device 20 has been released.

In addition, the display screen W140 includes an area E140 in which information (e.g., a user name) based on address book information acquired from the terminal device 20 is displayed. The user can select, from the area E140, a user (address) to which an image is transmitted.

Figure 10B:
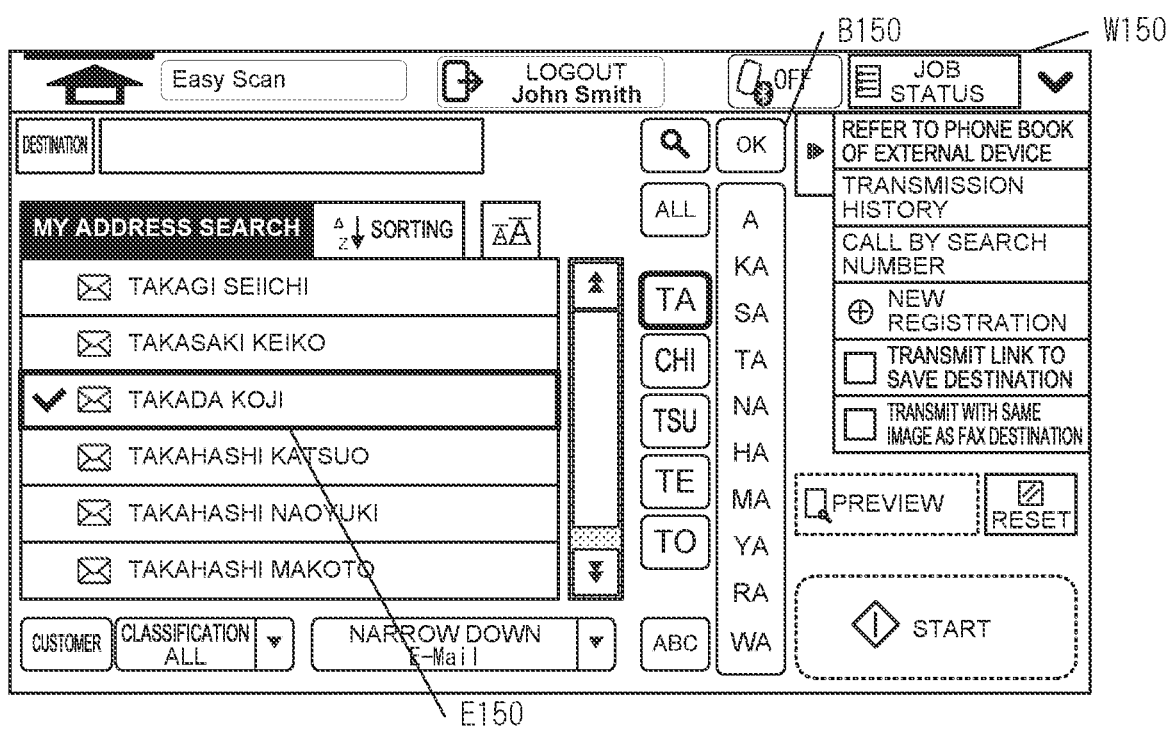

FIG. 10B is a diagram illustrating an example of a display screen W150 to be displayed on the displayer 140 in a case where a user is selected on the display screen W140. A user (address) to which an image is transmitted is displayed separately from a user (address) to which the image is not transmitted, as illustrated by E150. For example, on a user (address) to which an image is transmitted, a check mark is attached, a background color is changed, or characters of a user name and the like are decorated. The user can determine a transmission destination of an image by selecting a determination button B150.

The present embodiment is described regarding a case in which near field communication method to be used by the image processing apparatus 10 and the terminal device 20 is Bluetooth. However, even when another method is used, the above-described processing may be performed with necessary modifications. Specifically, even when another method is used, the image processing apparatus 10 releases pairing with the terminal device 20 by deleting information necessary for communication with the terminal device 20 after mobile address book is received from the terminal device 20.

As described above, the image processing apparatus according to the present embodiment releases pairing with the terminal device as it is, after acquiring address book information from the terminal device. Since pairing with the image processing apparatus is immediately released without performing any operation after allowing the image processing apparatus to transmit address book information from the terminal device, the user can prevent unintended communication between the image processing apparatus and the terminal device. This prevents other users from acquiring address book information from the terminal device by operating the image forming apparatus.

In particular, in the present embodiment, the image processing apparatus releases pairing when receiving address book information from the terminal device has been completed. This allows the image forming apparatus to reduce a likelihood with which address book information is acquired by other users against the user's intention as much as possible, and improve security.

In addition, the image processing apparatus according to the present embodiment displays an ON icon in a case where pairing with the terminal device is performed, and displays an OFF icon in a case where pairing with the terminal device is released, thereby displaying an identification indication indicating a pairing state with the terminal device. By confirming an ON icon and an OFF icon, the user can recognize whether the image forming apparatus and the terminal device are in a communicable state. For example, by confirming that an OFF icon is displayed, the user can recognize that the terminal device and the image forming apparatus do not perform communication without permission at an unintended place.

2. Second Embodiment

Next, a second embodiment is described. Unlike the first embodiment, the second embodiment is an embodiment in which pairing with a terminal device is released when a transmission destination based on address book information acquired from the terminal device is selected as a transmission destination of an image. The present embodiment is an embodiment in which FIG. 6 of the first embodiment is replaced with FIG. 11. Note that, the same processing is indicated with the same reference sign, and description thereof is omitted.

Figure 11:
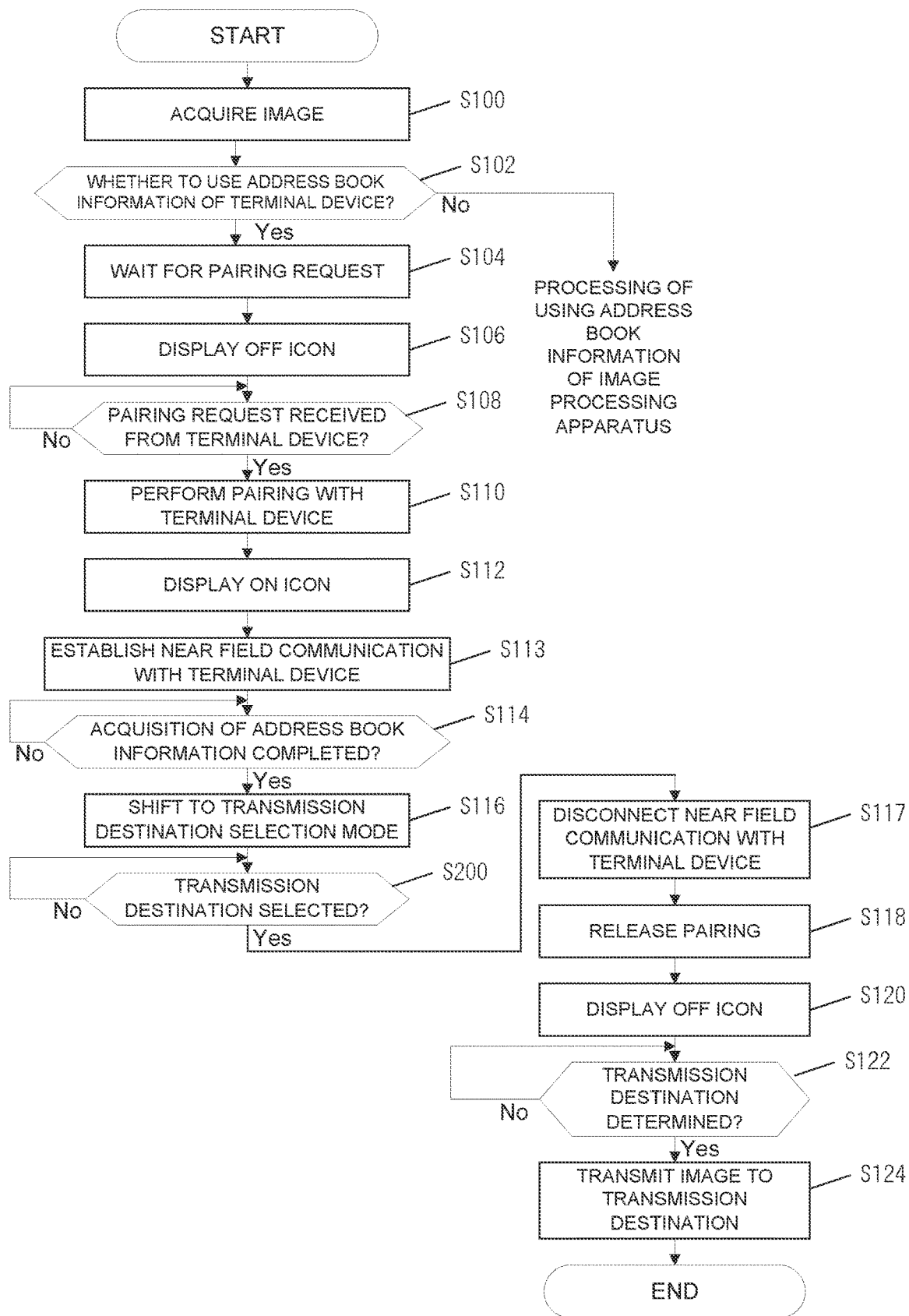
FIG. 11 is a flowchart illustrating a flow of processing to be performed by an image processing apparatus according to a second embodiment.

Referring to FIG. 11, a flow of image transmission processing to be performed by an image processing apparatus 10 according to the present embodiment is described. In the present embodiment, even when processing of shifting to a transmission destination selection mode in step S116 is performed, a controller 100 does not release pairing with a terminal device 20 at the point of time.

On the other hand, in the present embodiment, in a case where a transmission destination based on address book information acquired from the terminal device 20 is selected by the user, the controller 100 disconnects near field communication with the terminal device 20 (step S200; Yes→step S117). Further, the controller 100 releases pairing with the terminal device 20 (step S118), and controls to display an OFF icon (Step S120). Note that, in a case where a transmission destination is not selected in step S200, the controller 200 repeatedly performs processing in step S200 (step S200; No).

Figure 12A:
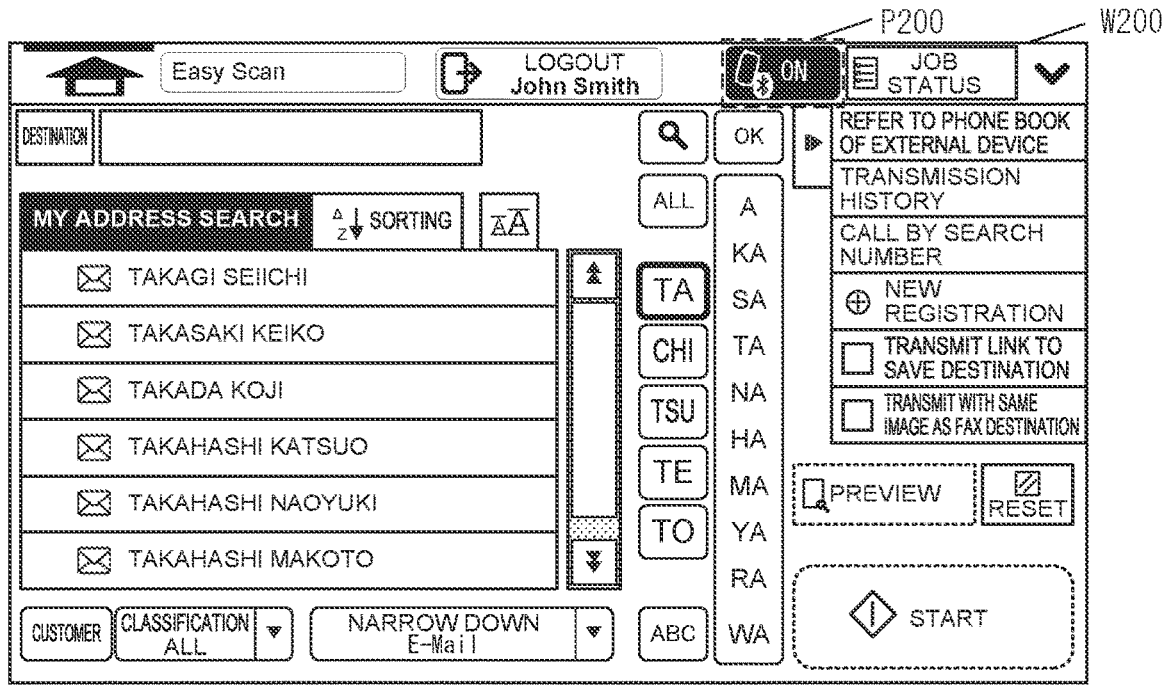
FIGS. 12A and 12B are diagrams illustrating an operation example according to the second embodiment.
Figure 12B:
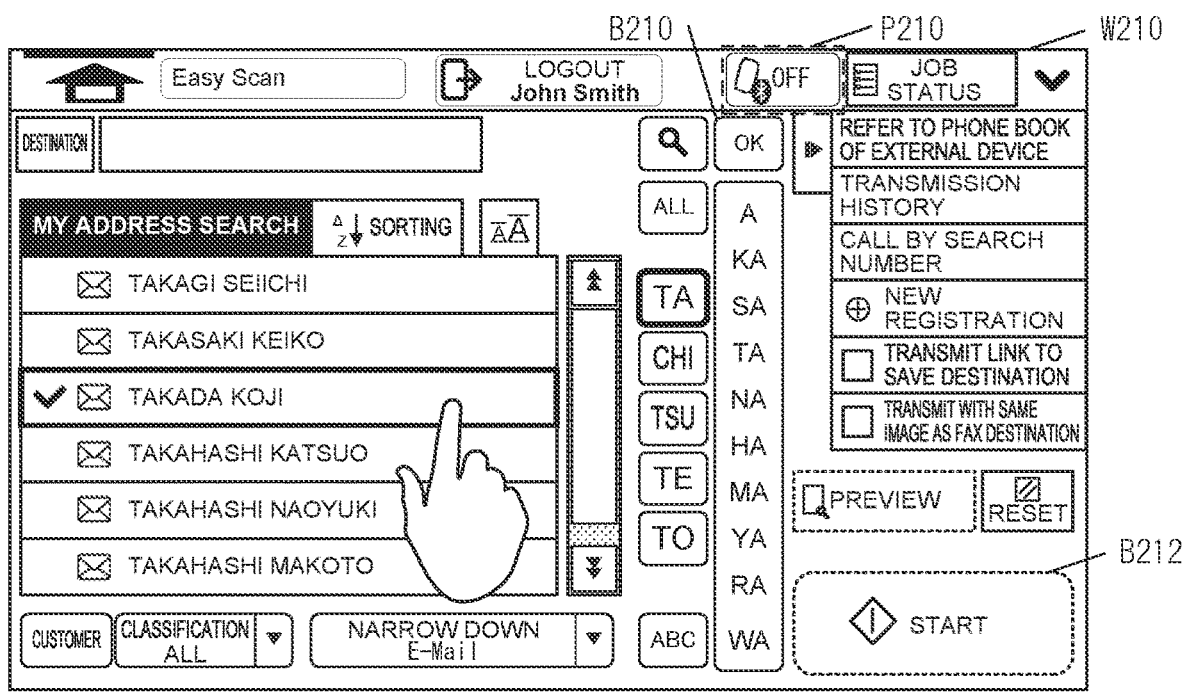

Referring to FIGS. 12A and 12B, an operation example according to the present embodiment is described. FIG. 12A is a diagram illustrating an example of a display screen W200 (transmission destination selection screen) to be displayed on a displayer 140 after an image processing apparatus 10 reads address book information stored in the terminal device 20. In the present embodiment, the image processing apparatus 10 does not release pairing with the terminal device 20 at a point of time when address book information stored in the terminal device 20 is read. Therefore, unlike the display screen W140 illustrated in FIG. 10A of the first embodiment, an ON icon P200 is displayed on the display screen W200.

FIG. 12B is a diagram illustrating an example of a display screen W210 to be displayed on the displayer 140 in a case where one transmission destination is selected on the display screen W200 illustrated in FIG. 12A. In the present embodiment, when a transmission destination based on address book information acquired from the terminal device 20 is selected, pairing with the terminal device 20 is released. Therefore, an OFF icon P210 indicating that pairing with the terminal device is released is displayed on the display screen W210.

In this way, in the present embodiment, until a transmission destination based on address book information acquired from the terminal device 20 is selected, the image processing apparatus 10 is in a pairing state with the terminal device 20. Therefore, in a case of acquiring address book information from the terminal device 20, even when a timeout occurs in communication with the terminal device 20 due to some failure, unlike the first embodiment, the image processing apparatus 10 does not release pairing with the terminal device 20. Consequently, the image processing apparatus 10 can communicate with the terminal device 20, and acquire address book information from the terminal device 20 without performing pairing with the terminal device 20 again.

Note that, the image processing apparatus 10 may release pairing with the terminal device 20 when a transmission destination is determined, instead of releasing pairing when a transmission destination based on address book information acquired from the terminal device 20 is selected. A case where a transmission destination is determined is, for example, the following cases.
(1) A case where an operation for determining a transmission destination is performed
(2) A case where an operation for performing image transmission processing is performed The case (1) is, for example, a case in which a button (e.g., a button B210 in FIG. 12B) for determining a transmission destination is selected on a transmission destination selection screen. Also, the case (2) is, for example, a case in which an image transmission start button (e.g., a start button B212 in FIG. 12B, or a predetermined hardware key provided on the image processing apparatus 10) is selected. In this case, the image processing apparatus 10 releases pairing with the terminal device 20, and displays an OFF icon P210 on the displayer 140 by assuming that a transmission destination is determined.

In this way, the image processing apparatus according to the present embodiment sets a timing of releasing pairing to a time when a transmission destination is selected, or when a transmission destination is determined. This reduces a likelihood with which address book information is acquired by other users, without lowering user convenience. For example, if pairing is released when receiving address book information is completed as in the first embodiment, the image processing apparatus can achieve a high level of security, but when address book information is acquired again from the terminal device, pairing with the terminal device is required again.

On the other hand, in the present embodiment, even when address book information is acquired again from the terminal device, the image processing apparatus can acquire the address book information from the terminal device without performing pairing again, because pairing with the terminal device has not been released at the point of time.

3. Third Embodiment

Next, a third embodiment is described. The third embodiment is an embodiment in which an image processing apparatus releases pairing with a terminal device when the image processing apparatus acquires address book information from the terminal device, or when the image processing apparatus shifts from a transmission destination selection mode to another mode.

Figure 13:
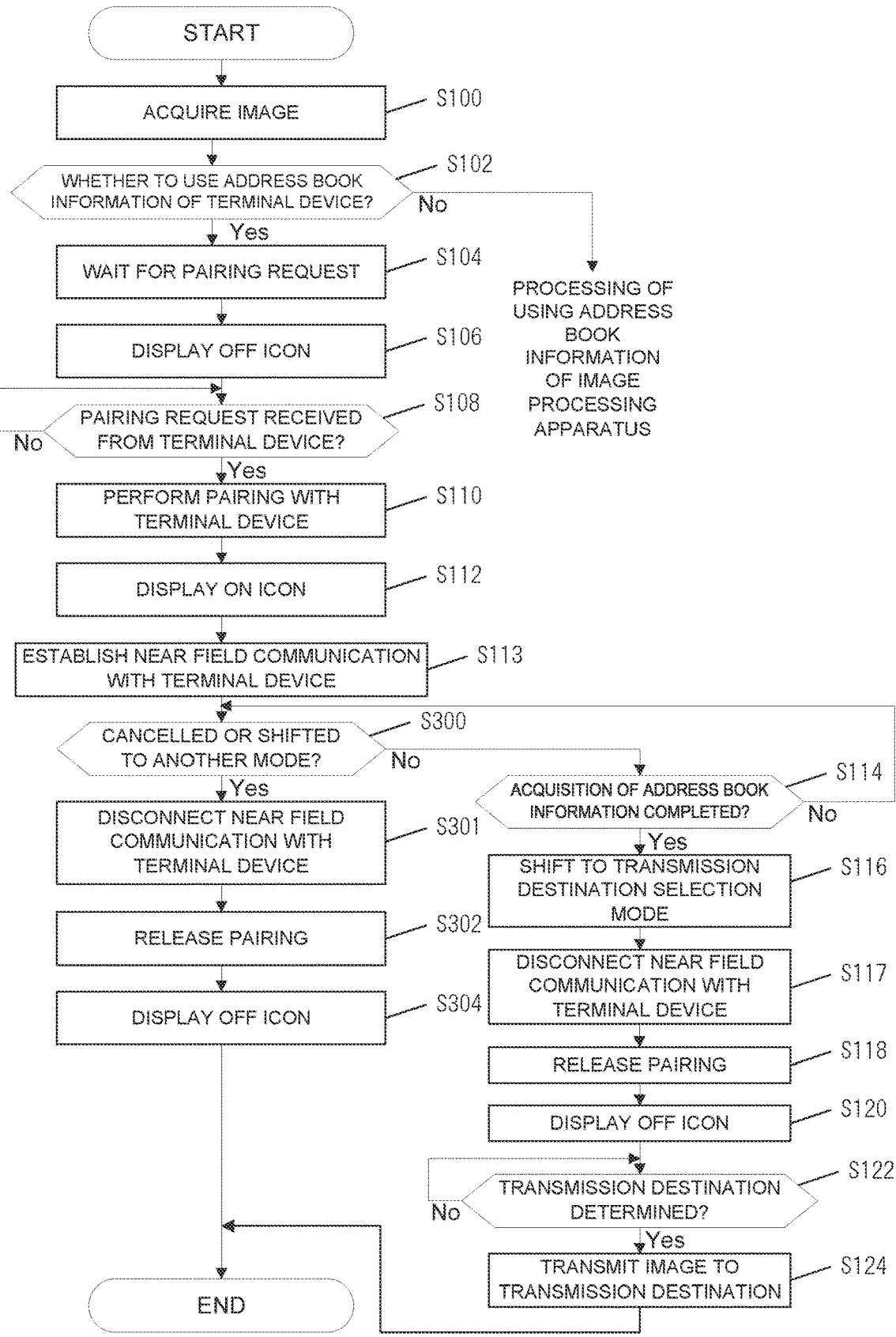
FIG. 13 is a flowchart illustrating a flow of processing to be performed by an image processing apparatus according to a third embodiment.

First, processing to be performed by a controller 100 in a case where the present embodiment is applied to the first embodiment is described. In this case, the controller 100 performs processing illustrated in FIG. 13, instead of processing illustrated in FIG. 6 of the first embodiment. Note that, the same processing is indicated with the same reference sign, and description thereof is omitted.

After performing control to display an ON icon in step S112, the controller 100 establishes near field communication with a terminal device 20, and acquires address book information from the terminal device 20. Note that, in the present embodiment, an operation mode of the image processing apparatus 10 in a case of acquiring address book information from the terminal device 20 is referred to as an address book acquisition mode.

Herein, the controller 100 determines whether an operation to cancel acquisition of address book information is performed by the user, or whether an operation to shift the image processing apparatus 10 from a transmission destination selection mode to another mode is performed by the user (step S300). Note that, the other mode in the present embodiment is an operation mode for executing a function (e.g., a copy function or a print function) other than an image transmission function. Also, when the controller 100 is operated by the user to cancel acquisition of address book information, the controller 100 interrupts acquisition of address book information.

In a case where an operation to cancel acquisition of address book information is performed by the user, or an operation to shift to another mode is performed by the user, the controller 100 disconnects near field communication with the terminal device 20 (step S300; Yes→step S301). Further, the controller 100 releases pairing with the terminal device 20 (step S302), and controls to display an OFF icon (step S304). Thus, the controller 100 can release pairing in conjunction with disconnecting communication with the terminal device 20 when acquisition of address book information, which is information on a transmission destination of an image, is interrupted, or when the image processing apparatus 10 shifts from an address book acquisition mode to another mode. Note that, in a case where an operation to cancel acquisition of address book information is performed by the user, the controller 100 may erase a message indicating that address book information stored in the terminal device 20 is being read. Further, in a case where an operation to shift to another mode is performed by the user, the controller 100 may shift to a predetermined mode, based on an instruction of the user.

Note that, in a case where acquisition of address book information is not canceled by the user, and an operation to shift to another mode is not performed by the user, the controller 100 determines whether acquisition of address book information has been completed (step S300; No→step S114). In a case where acquisition of address book information has been completed, the controller 100 performs processing of shifting to a transmission destination selection mode in step S116 (step S114; Yes→step S116). On the other hand, in a case where acquisition of address book information has not been completed, the controller 100 returns to step S300 (step S114; No→step S300).

Figure 14:
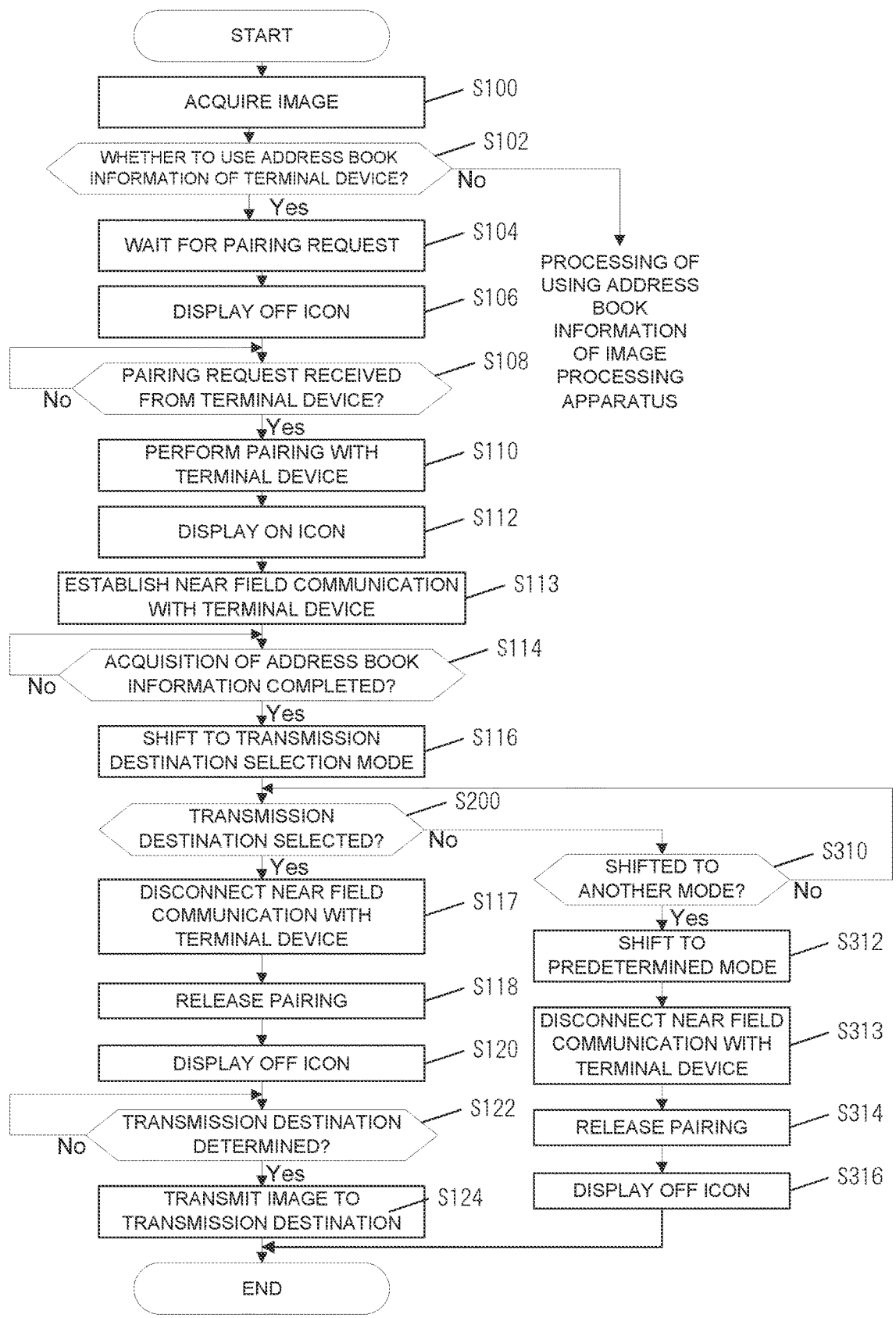
FIG. 14 is a flowchart illustrating a flow of processing to be performed by the image processing apparatus according to the third embodiment.

Next, processing to be performed by the controller 100 is described in a case where the present embodiment is applied to the second embodiment. In this case, the controller 100 performs processing illustrated in FIG. 14, instead of processing illustrated in FIG. 11 of the second embodiment. Note that, the same processing is indicated with the same reference sign, and description thereof is omitted.

In the present embodiment, after shifting to a transmission destination selection mode, the controller 100 determines whether a transmission destination based on address book information acquired from the terminal device 20 has been selected (step S116→step S200). At this occasion, in a case where a transmission destination based on address book information acquired from the terminal device 20 is not selected, the controller 100 determines whether an operation to shift to another mode has been performed by the user (step S200; No→step S310).

In a case where an operation to shift to another mode has been performed by the user, the controller 100 shifts to the selected predetermined mode (step S310; Yes→step S312). At this occasion, the controller 100 disconnects near field communication with the terminal device 20 (step S313), and furthermore, releases pairing with the terminal device 20 (step S314). Specifically, in a case where the controller 100 shifts to a mode different from a transmission destination selection mode, which is a mode for allowing the user to select a transmission destination based on address book information acquired from the terminal device 20, the controller 100 releases pairing in conjunction with disconnecting near field communication with the terminal device 20. Further, the controller 100 controls to display an OFF icon (step S316). On the other hand, in a case where an operation to shift to another mode is not performed by the user, the controller 100 returns to step S200 (step S310; No→step S200).

Figure 15A:
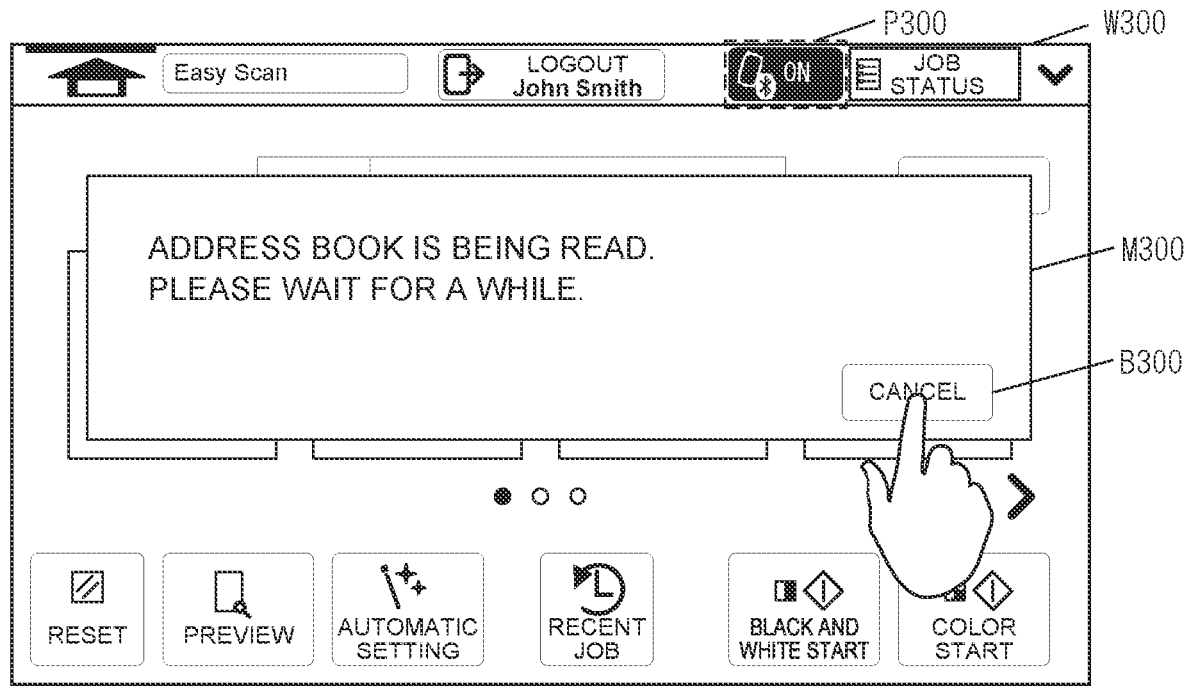
FIGS. 15A and 15B are diagrams illustrating an operation example according to the third embodiment.
Figure 15B:
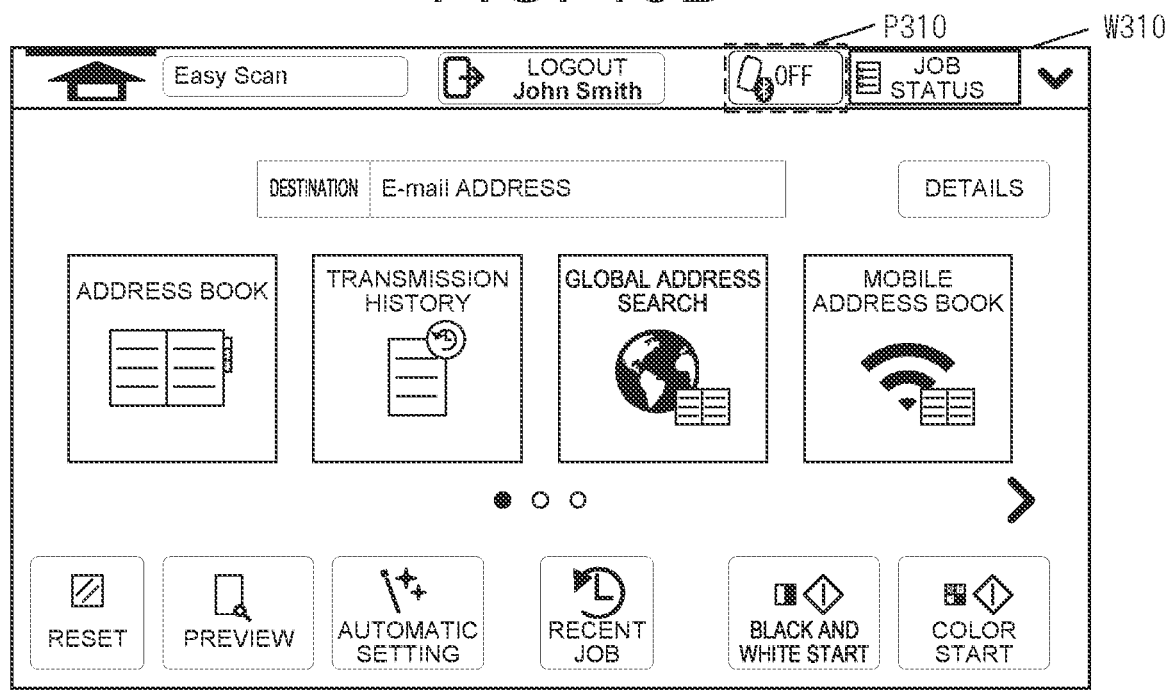

Referring to FIGS. 15A and 15B, an operation example according to the present embodiment is described. FIG. 15A is a diagram illustrating an example of a display screen W300 to be displayed on a displayer 140 of the image processing apparatus 10 when address book information is received from the terminal device 20. At this point of time, since the image processing apparatus 10 is performing pairing with the terminal device 20, an ON icon P300 is displayed on the display screen W300.

A message M300 indicating that address book information stored in the terminal device 20 is being read is displayed on the display screen W300. The message M300 also includes a button B300 for canceling reading of address book information from the terminal device 20.

FIG. 15B is a diagram illustrating an example of a display screen W310 to be displayed on the displayer 140 of the image processing apparatus 10 in a case where the button B300 is selected by the user. In a case where acquisition of address book information is cancelled by the user, in the present embodiment, the image processing apparatus 10 releases pairing with the terminal device 20. Therefore, an OFF icon P310 is displayed on the display screen W310.

In this way, the image processing apparatus according to the present embodiment releases pairing with the terminal device, in a case where the image processing apparatus shifts from an address book acquisition mode or a transmission destination selection mode to another mode, or in a case where acquisition of address book information stored in the terminal device is cancelled. Specifically, the image processing apparatus according to the present embodiment releases pairing when address book data acquired from the terminal device is no longer needed. Therefore, the user does not need to perform an operation of releasing pairing with the terminal device, even when the user shifts the image processing apparatus to another mode, or cancel acquisition of address book information stored in the terminal device. Therefore, even when the user forgets to release pairing with the terminal device when the image processing apparatus shifts to another mode, it is possible to prevent communication between the terminal device and the image forming apparatus against the user's intention, because pairing with the terminal device is automatically released.

4. Fourth Embodiment

Next, a fourth embodiment is described. The fourth embodiment is an embodiment in which an image processing apparatus performs image transmission, and releases pairing with a terminal device at a timing when transmission is successful. The present embodiment is an embodiment in which FIG. 6 in the first embodiment is replaced with FIG. 16. Note that, the same processing is indicated with the same reference sign, and description thereof is omitted.

Figure 16:
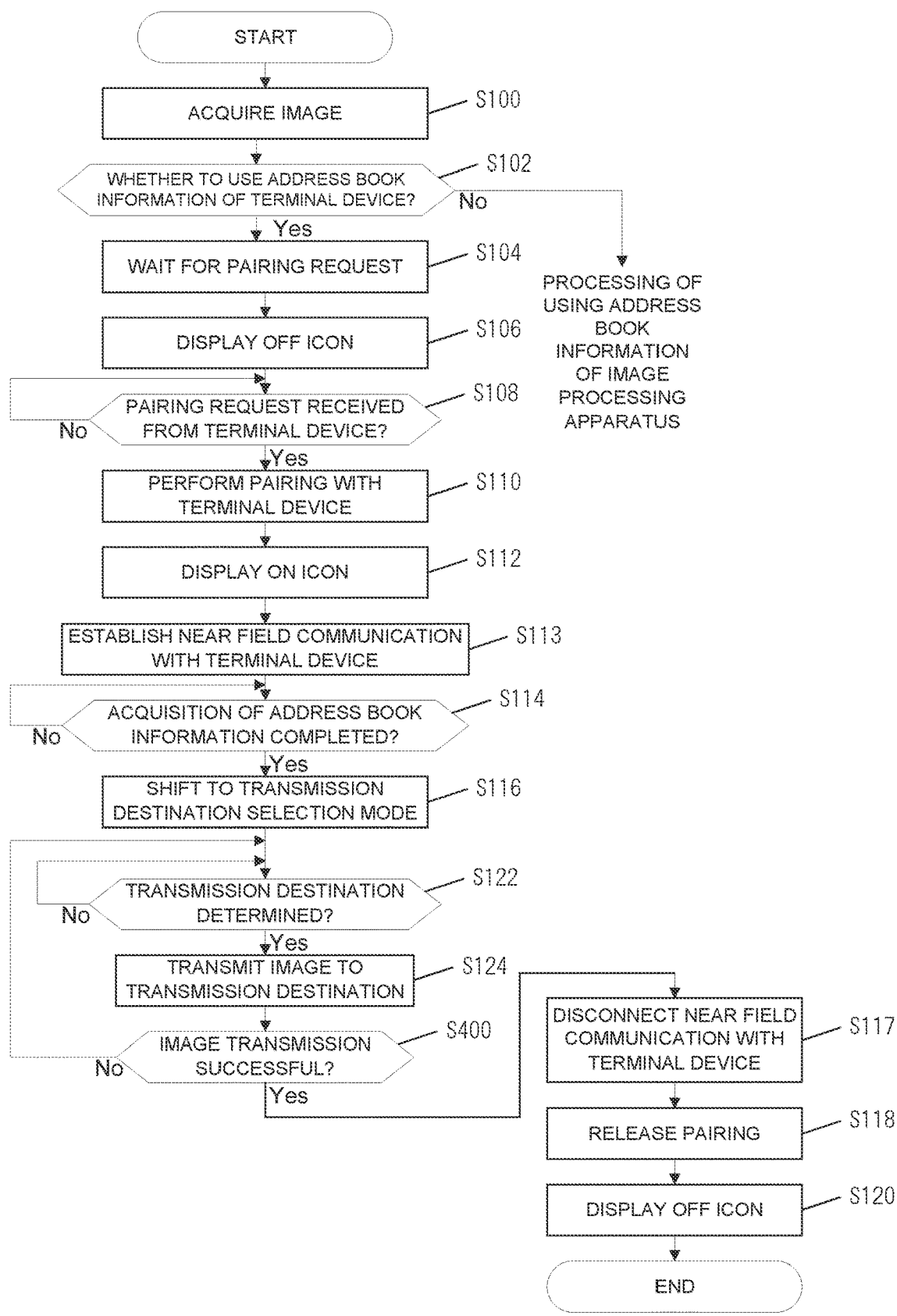
FIG. 16 is a flowchart illustrating a flow of processing to be performed by an image processing apparatus according to a fourth embodiment.

With reference to FIG. 16, a flow of image transmission processing to be performed by an image processing apparatus 10 according to the present embodiment is described. In the present embodiment, even when a controller 100 performs processing of shifting to a transmission destination selection mode in step S116, the controller 100 does not release pairing with a terminal device 20 at the point of time.

Meanwhile, in the present embodiment, the controller 100 performs processing of transmitting an image to a transmission destination, and determines whether the image transmission is successful (completed) (step S124→step S400). A case where image transmission is successful is, for example, a case where, after issuing a request to transmit an image to a transmission destination device in step S124, the controller 100 receives a signal or information indicating that the request has been accepted.

In a case where image transmission is successful, the controller 100 disconnects near field communication with the terminal device 20 (step S400; Yes→step S117). Further, the controller 100 releases pairing with the terminal device 20, and controls to display an OFF icon (step S118→step S120). In this case, the controller 100 may shift the operation mode of the image processing apparatus 10 from an image transmission mode to another mode. Thus, the controller 100 can release pairing at a timing when the image processing apparatus exits the image transmission mode. On the other hand, in a case where image transmission is not successful, the controller 100 returns to step S122 (step S400; No→step S122). In this case, the controller 100 can allow the user to select a transmission destination again.

Figure 17A:
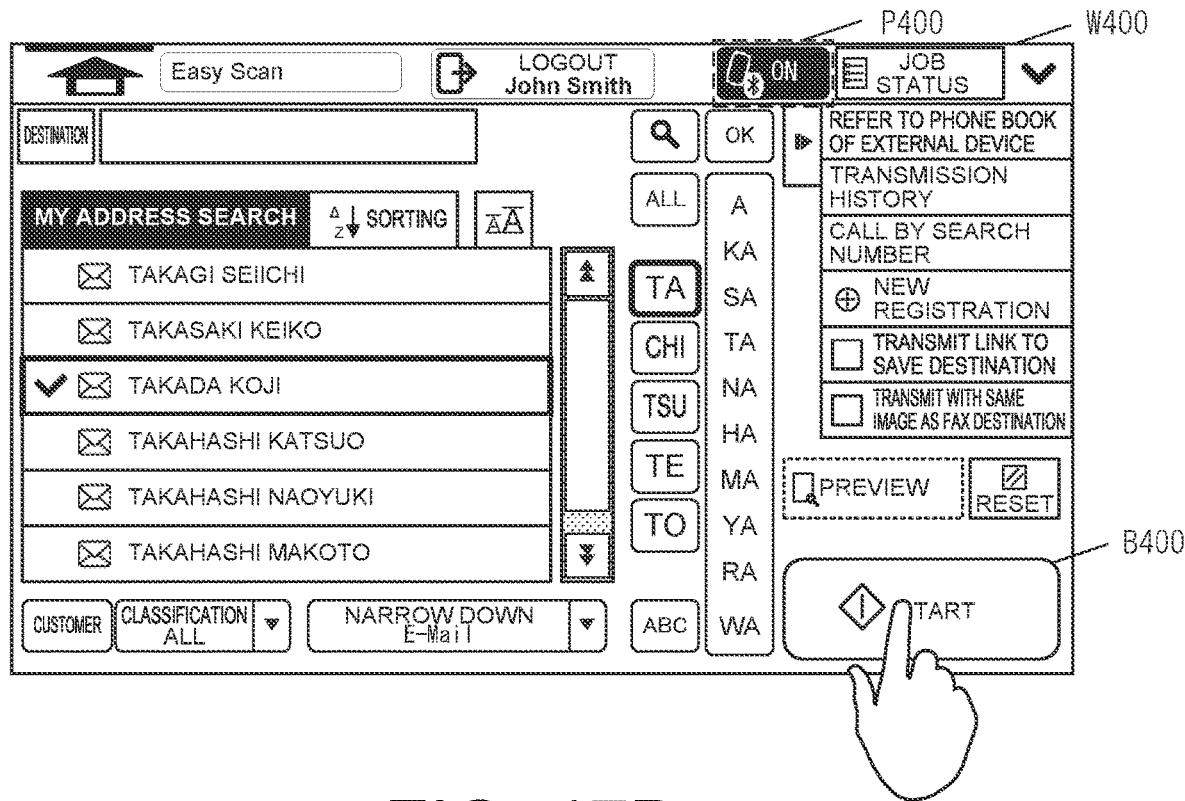
FIGS. 17A and 17B are diagrams illustrating an operation example according to the fourth embodiment.
Figure 17B:
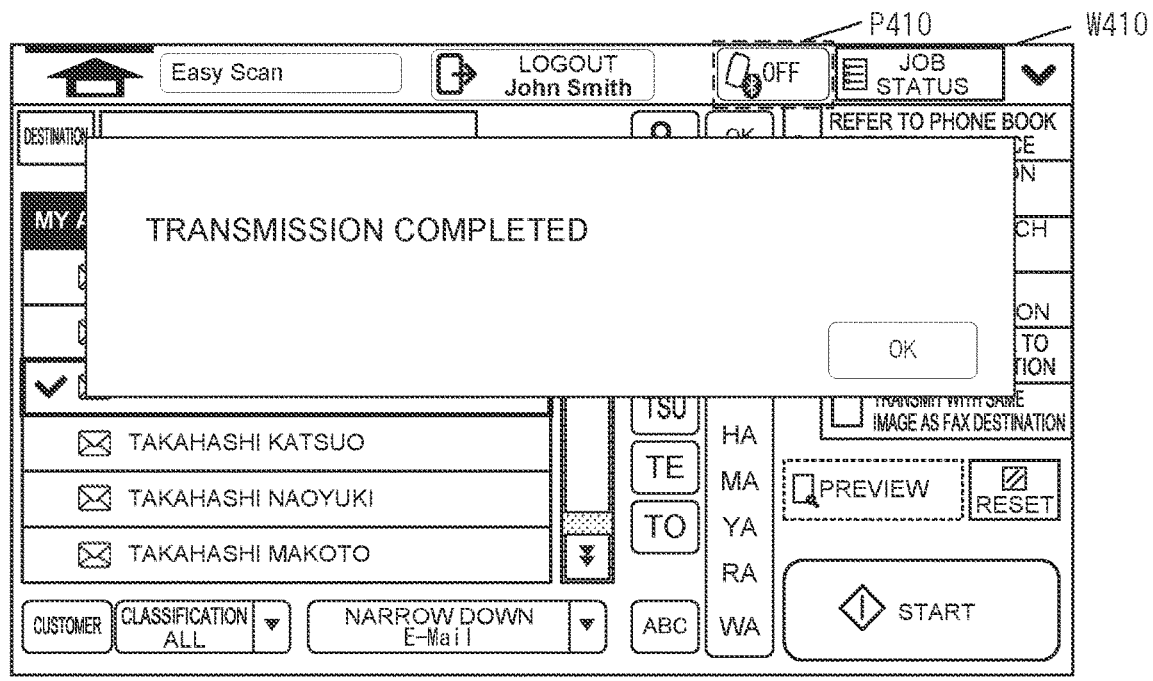

With reference to FIGS. 17A and 17B, an operation example according to the present embodiment is described. FIG. 17A is a diagram illustrating an example of a display screen W400 to be displayed on a displayer 140 of the image processing apparatus 10 when an operation to transmit an image is performed by the user. An operation to transmit an image is, for example, an operation in which an image transmission start button B400 is selected. In the present embodiment, when image transmission is performed, an ON icon P400 is displayed on the display screen W400 because pairing with the terminal device 20 is not released by the image processing apparatus 10.

FIG. 17B is a diagram illustrating an example of a display screen W410 to be displayed on the displayer 140 of the image processing apparatus 10 when image transmission is successful. In the present embodiment, since pairing with the terminal device 20 is released by the image processing apparatus 10 when image transmission is successful, an OFF icon P410 is displayed on the display screen W410.

In this way, in the image processing apparatus according to the present embodiment, pairing with the terminal device 20 is released by the image processing apparatus 10 when image transmission is successful, and in a case other than the case where image transmission is successful, pairing with the terminal device 20 is not released. Therefore, the image processing apparatus according to the present embodiment can communicate with the terminal device, or acquire address book information again from the terminal device at any timing until image transmission is successful.

5. Fifth Embodiment

Next, a fifth embodiment is described. The fifth embodiment is an embodiment in which releasing pairing is achieved at any timing by a user's instruction.

In the present embodiment, a controller 100 performs processing illustrated in FIG. 18 in parallel with processing to be performed when an image transmission function is selected by the user, as illustrated in FIG. 6 of the first embodiment.

Referring to FIG. 18, in the present embodiment, processing to be performed by the controller 100 in parallel with other processing is described. First, the controller 100 determines whether pairing with a terminal device 20 is performed (step S500). In a case where pairing is performed with the terminal device 20, the controller 100 determines whether an ON icon (first identification indication) displayed on a displayer 140 is selected by the user (step S500; Yes→step S502).

In a case where the ON icon (first identification indication) is selected by the user, the controller 100 displays, on the displayer 140, a message asking the user to confirm whether to release pairing (step S502; Yes→step S504).

In a case where releasing pairing is selected by the user, the controller 100 determines whether near field communication with the terminal device 20 has been established (step S506; Yes→step S508). In a case where near field communication with the terminal device 20 has been established, the controller 100 disconnects the near field communication (step S508; Yes→step S510). In a case where near field communication with the terminal device 20 has not been established, the controller 100 skips processing in step S510 (step S508; No).

Subsequently, the controller 100 releases pairing with the terminal device 20, and controls to display an OFF icon on the displayer 140 (step S512→step S514).

In step S506, in a case where releasing pairing is not selected by the user, the controller 100 returns to step S500 (step S506; No→step S500).

In addition, in step S502, in a case where the controller 100 determines that the ON icon is not selected, the controller 100 returns to step S500 (step S502; No→step S500). Also, in step S500, in a case where the controller 100 determines that pairing with the terminal device 20 has not been performed, the controller 100 skips the above-described processing from step S502 to step S510, and finishes processing illustrated in FIG. 18 (step S500; No).

The controller 100 performs processing illustrated in FIG. 18 periodically or when pairing with the terminal device 20 is performed. Thus, the controller 100 can release pairing with the terminal device 20 in a case where pairing with the terminal device 20 is performed, and when the ON icon is selected by the user.

Figure 19A:
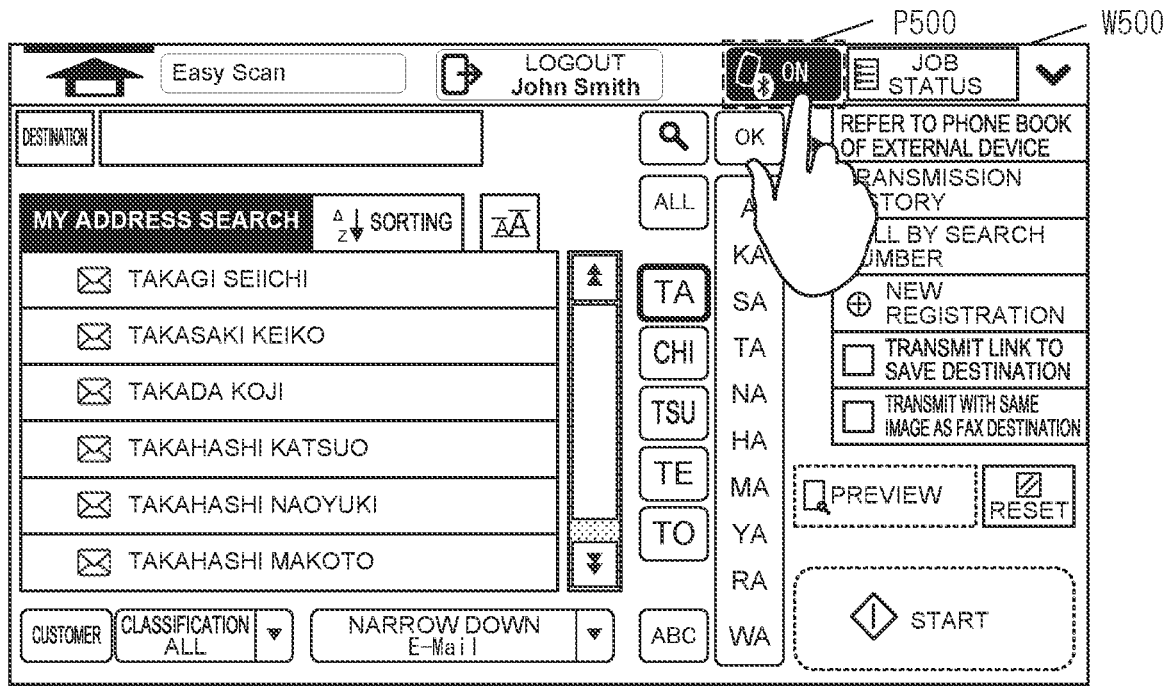
FIGS. 19A and 19B are diagrams illustrating an operation example according to the fifth embodiment.
Figure 19B:
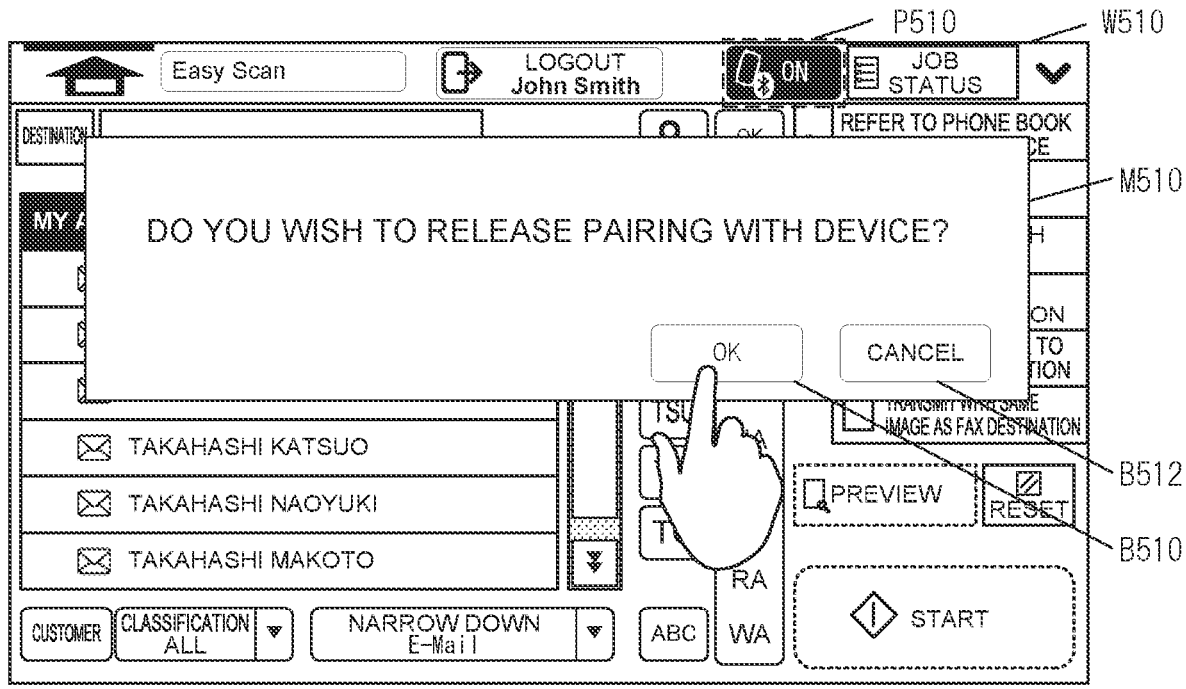

Referring to FIGS. 19A and 19B, an operation example according to the present embodiment is described. FIG. 19A is a diagram illustrating an example of a display screen W500 (transmission destination selection screen) to be displayed on the displayer 140 after the image processing apparatus 10 reads address book information stored in the terminal device 20. In a case where the image processing apparatus 10 has not released pairing with the terminal device 20 at this point of time, an ON icon P500 is displayed on the display screen W500.

FIG. 19B is a diagram illustrating an example of a display screen W510 to be displayed on the displayer 140 in a case where the ON icon P500 displayed on the display screen W500 is selected. A message M510 for asking the user to confirm whether to release pairing is displayed on the display screen W510. The message M510 includes a button B510 indicating that pairing is released, and a button B512 indicating that pairing is not released. Note that, an ON icon P510 is displayed on the display screen W510 because the image processing apparatus 10 is performing pairing with the terminal device 20 at this point of time.

Figure 20:
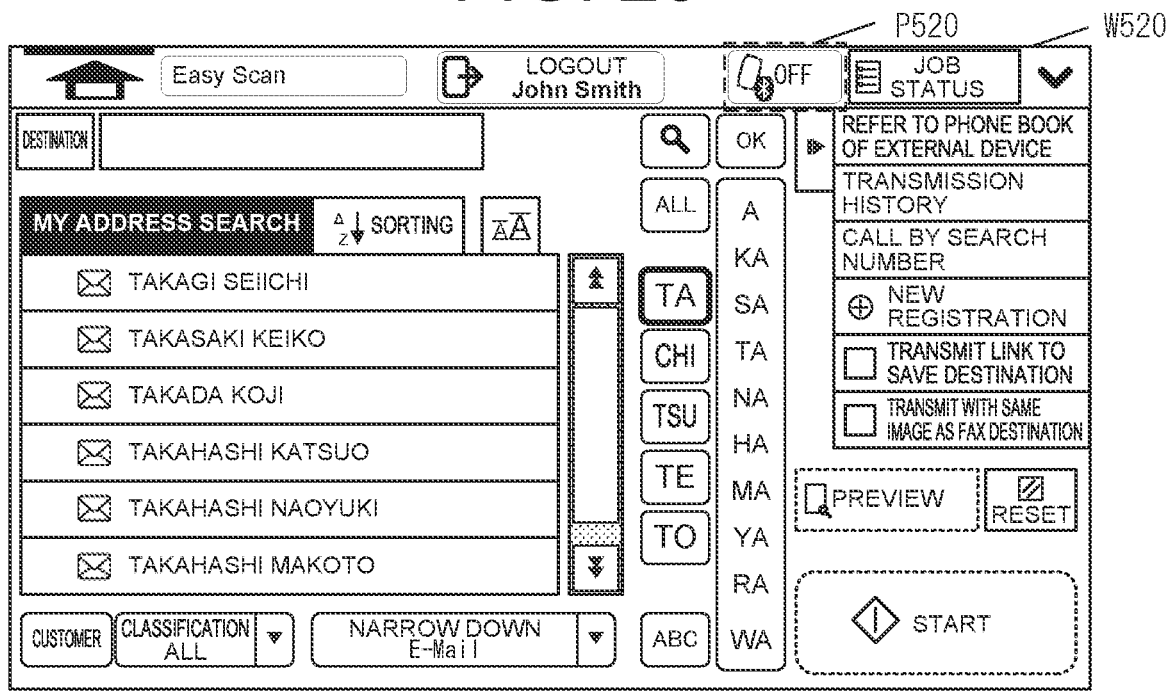
FIG. 20 is a diagram illustrating an operation example according to the fifth embodiment.

FIG. 20 is a diagram illustrating an example of a display screen W520 to be displayed on the displayer 140 when the button B510 indicating that pairing is released is selected on the display screen W510 illustrated in FIG. 19B. In this case, since the image processing apparatus 10 has released pairing with the terminal device 20, based on a user's operation, an OFF icon P520 is displayed on the display screen W520.

In this way, the image processing apparatus according to the present embodiment can release pairing with the terminal device at any timing, based on a user's instruction.

6. Sixth Embodiment

Figure 21:
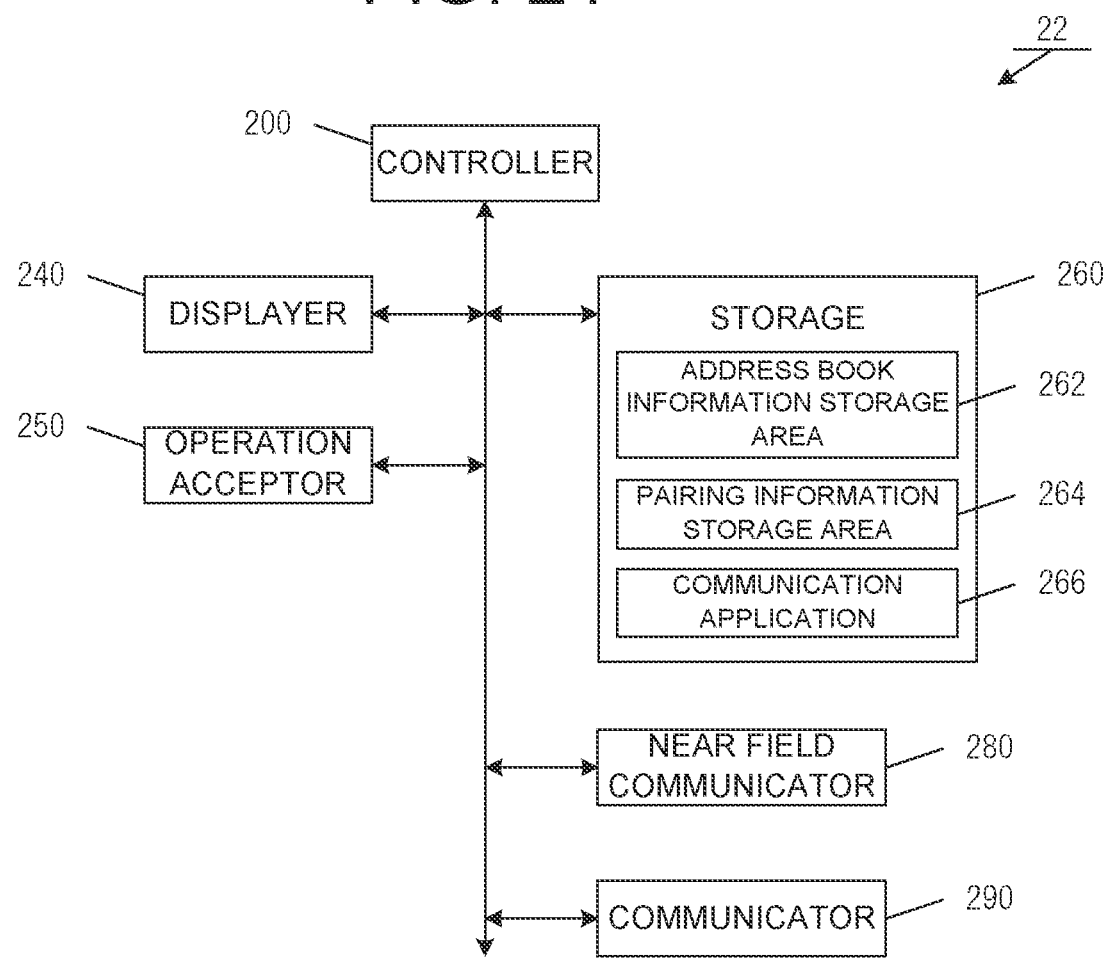
FIG. 21 is a diagram illustrating a functional configuration of a terminal device according to a sixth embodiment.

Next, a sixth embodiment is described. The sixth embodiment is an embodiment in which a dedicated application for transmitting address book information to an image processing apparatus is used in a terminal device. The present embodiment is an embodiment in which FIG. 2 in the first embodiment is replaced with FIG. 21. Note that, the same functional unit is indicated with the same reference sign, and description thereof is omitted.

Figure 22:
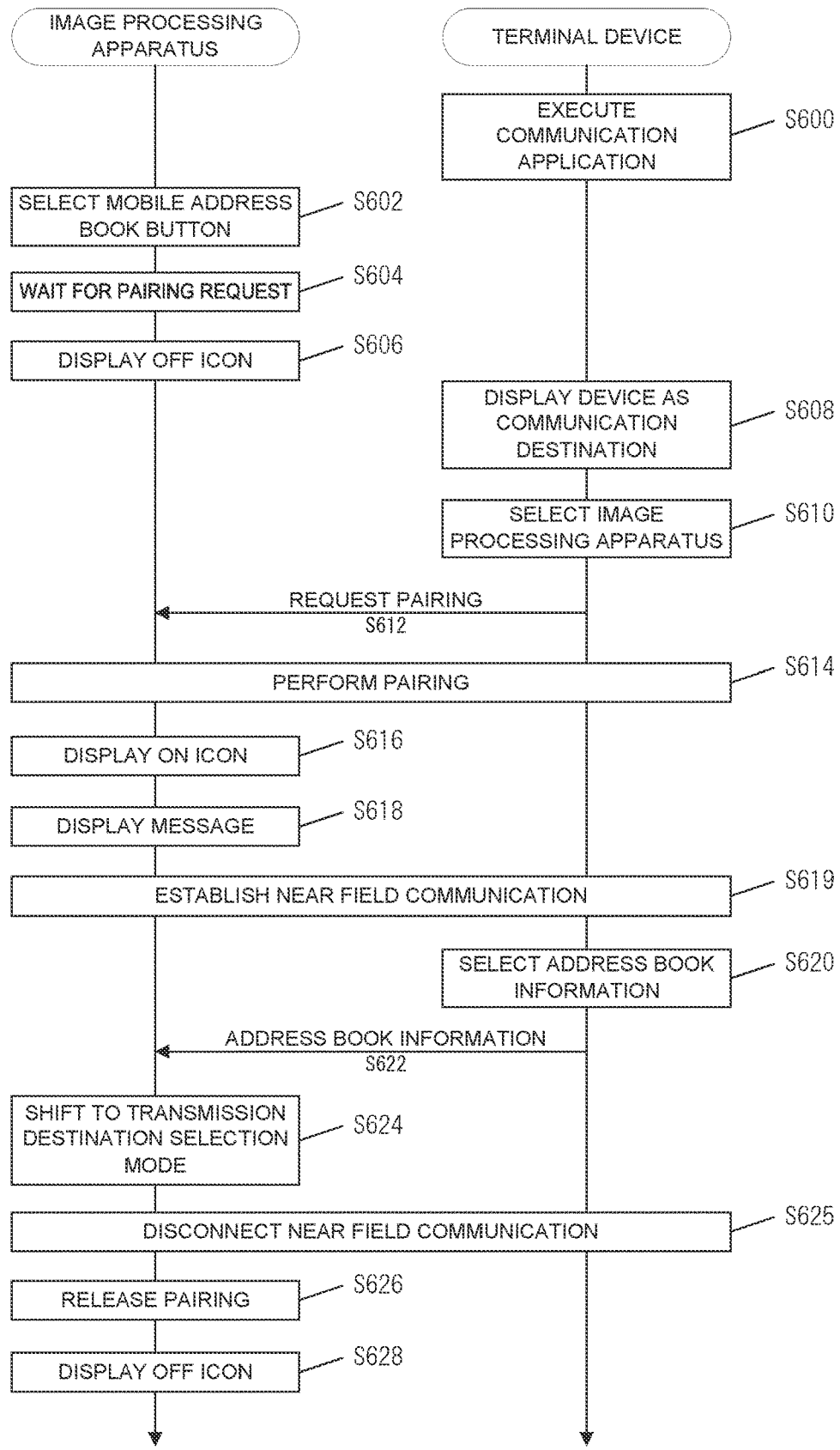
FIG. 22 is a sequence diagram illustrating a flow of processing to be performed by an image processing apparatus and the terminal device according to the sixth embodiment.

In the present embodiment, a terminal device 22 is included in a system 1, instead of a terminal device 20. FIG. 22 is a diagram illustrating a functional configuration of the terminal device 22. Unlike the terminal device 20, in the terminal device 22, a storage 260 further stores a communication application 266.

The communication application 266 is a dedicated application that causes a controller 200 to achieve a function of transmitting address book information stored in an address book information storage area 262 to an image processing apparatus 10, based on an operation of the terminal device 22. Specifically, in the present embodiment, the controller 200 transmits address book information to the image processing apparatus 10 by reading and executing the communication application 266, instead of using PBAP communication.

Referring to FIG. 22, a flow of processing to be performed by the image processing apparatus 10 and the terminal device 22 according to the present embodiment is described. First, the controller 200 of the terminal device 22 reads and executes the communication application 266 (S600). Note that, pieces of processing in S608 to S614, S619 to S622, and S625 to be described later are functions to be achieved by the communication application 266, and are performed by the controller 200 that has read the communication application 266.

Subsequently, a controller 100 of the image processing apparatus 10 displays, on a displayer 140, a "mobile address book" button indicating that address book information stored in an external device is used. In a case where the button is selected, the controller 100 sets the image processing apparatus 10 to a pairing request wait state (S602→S604). Further, the controller 100 displays an OFF icon on the displayer 140 (S606).

Subsequently, the controller 200 of the terminal device 22 displays, on a displayer 240, a communication destination device for near field communication (S608). At this occasion, in a case where the user selects the image processing apparatus 10, the controller 200 transmits a pairing request to the image processing apparatus 10 (S610→S612). Thus, pairing is performed between the image processing apparatus 10 and the terminal device 22 (S614).

The controller 100 of the image processing apparatus 10 displays an ON icon on the displayer 140 (S616), and further displays, on the displayer 140, a message indicating that address book information is being transferred (S618). Herein, the controller 100 waits until address book information is transmitted from the terminal device 22.

Subsequently, the controller 100 of the image processing apparatus 10 and the controller 200 of the terminal device 22 establish near field communication (S619). This enables the image processing apparatus 10 to acquire address book information from the terminal device 22.

Subsequently, the controller 200 of the terminal device 22 allows the user to select address book information to be transmitted to the image processing apparatus 10 by displaying, on a displayer 240, information (e.g., a user name) based on address book information stored in the address book information storage area 262 (S620). The controller 200 also transmits (transfers) the address book information selected by the user to the image processing apparatus 10 via a near field communicator 280 (S622).

In a case where the controller 100 of the image processing apparatus 10 receives address book information from the terminal device 22 via a near field communicator 180, the controller 100 shifts to a transmission destination selection mode to allow the user to select a transmission destination of an image (S624). Note that, information based on address book information received from the terminal device 22 in S622 is displayed on a transmission destination selection screen. In addition, the controller 100 of the image processing apparatus 10, and the controller 200 of the terminal device 22 disconnect near field communication (S625).

Subsequently, the controller 100 of the image processing apparatus 10 releases pairing with the terminal device 22 (S626), and controls to display an OFF icon on the displayer 140 (S628).

In this way, by performing the above-described processing by the image processing apparatus 10 and the terminal device 22, processing of transmitting address book information to the image processing apparatus 10 is achieved by using a communication application (dedicated application) to be executed in the terminal device 22.

An operation example according to the present embodiment is described. In the present embodiment, first, the image processing apparatus 10 and the terminal device 22 perform pairing. A screen to be displayed on the image processing apparatus 10 at this occasion is a screen similar to the one illustrated in FIG. 8 of the first embodiment.

Figure 23:
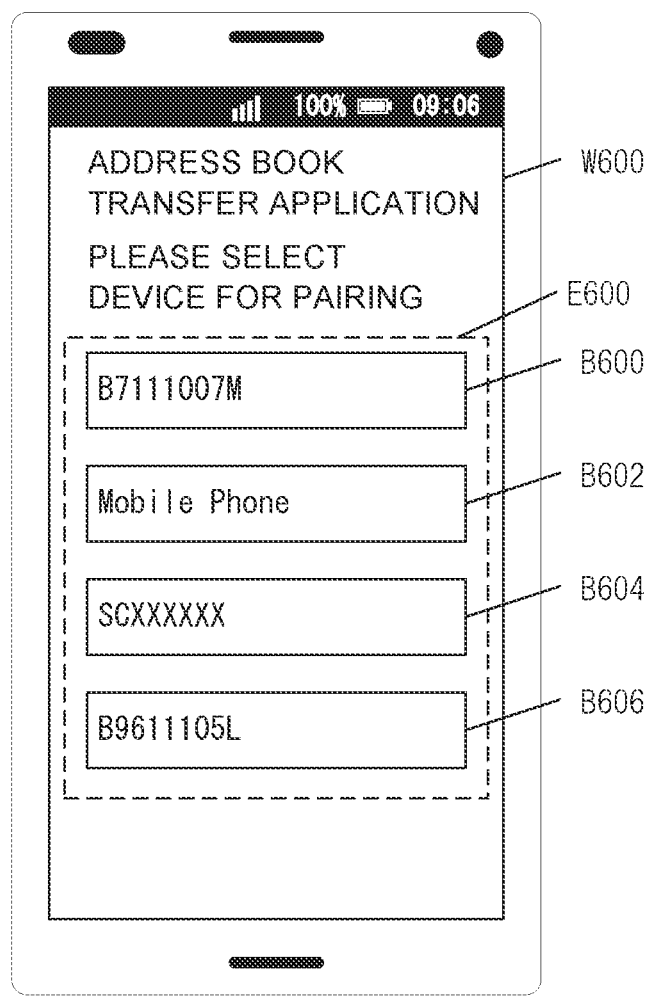
FIG. 23 is a diagram illustrating an operation example according to the sixth embodiment.

FIG. 23 is a diagram illustrating an example of a display screen W600 on which a communication destination device for near field communication is displayed. The display screen W600 is displayed on the displayer 240 of the terminal device 22. The display screen W600 includes an area E600 including a button indicating information (e.g., a name of a Bluetooth device) on a communication destination device. In the area E600, a button B600, a button B602, a button B604, and a button B606 are included as buttons indicating a communication destination device. The user can allow communication between the terminal device 22 and a desired device by using near field communication by selecting the button B600, the button B602, the button B604, or the button B606.

Figure 24A:
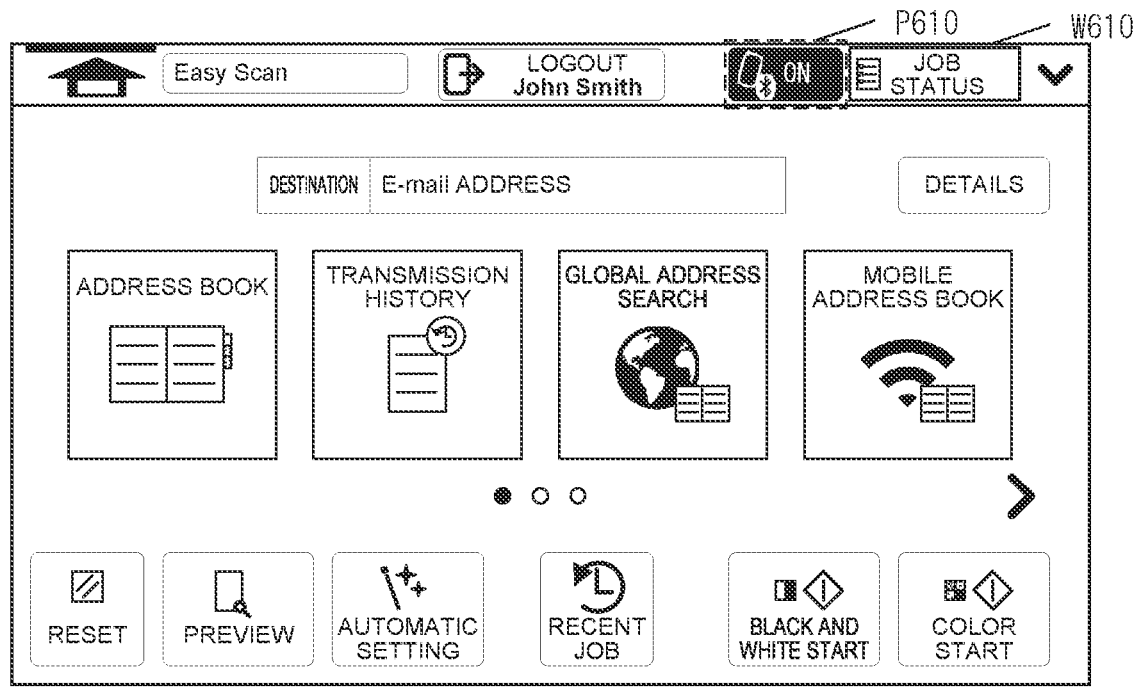
FIGS. 24A and 24B are diagrams illustrating an operation example according to the sixth embodiment.

FIG. 24A is a diagram illustrating an example of a display screen W610 to be displayed on the displayer 140 of the image processing apparatus 10 in a case where the image processing apparatus 10 receives address book information from the terminal device 22. FIG. 24A is a diagram illustrating an example of the display screen W610 to be displayed on the displayer 140 in a case where the image processing apparatus 10 has performed pairing with the terminal device 22. An ON icon P610 is displayed on the display screen W610 as a result of pairing with the terminal device 22.

Figure 24B:
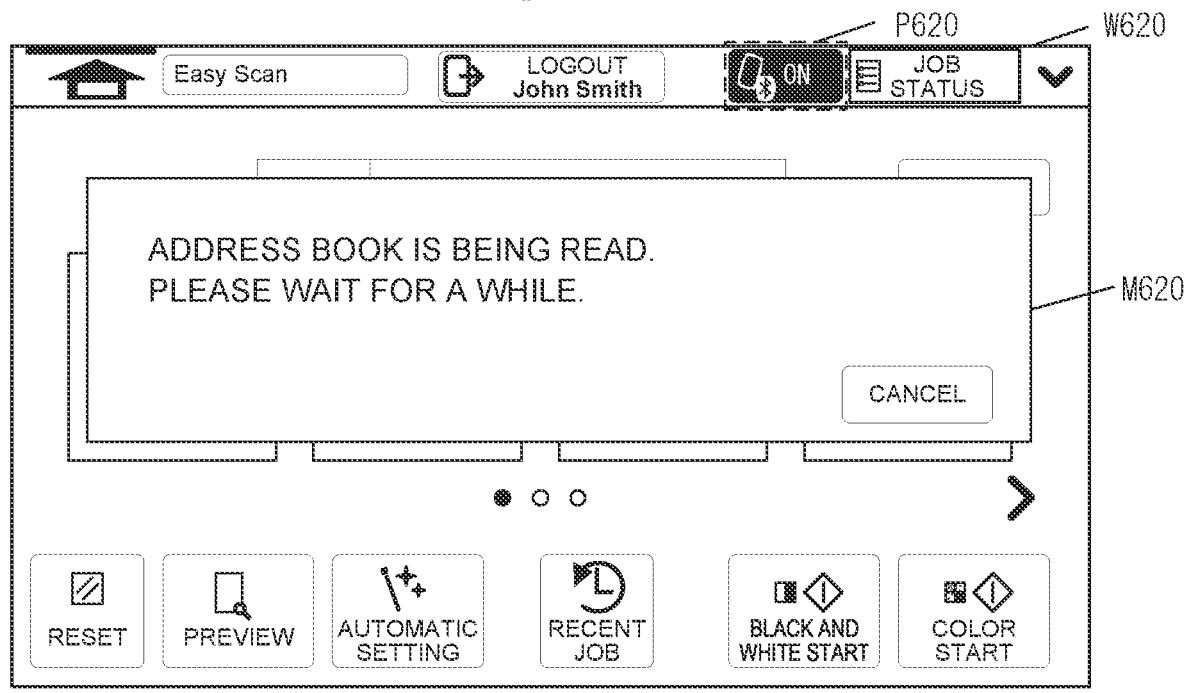

FIG. 24B is a diagram illustrating an example of a display screen W620 to be displayed on the displayer 140 of the image processing apparatus 10 when the image processing apparatus 10 is waiting for transmission of address book information from the terminal device 22. A message M620 indicating that address book information is being transferred is displayed on the display screen W620. Also, an ON icon P620 is displayed on the display screen W620 as a result of pairing with the terminal device 22.

Figure 25:
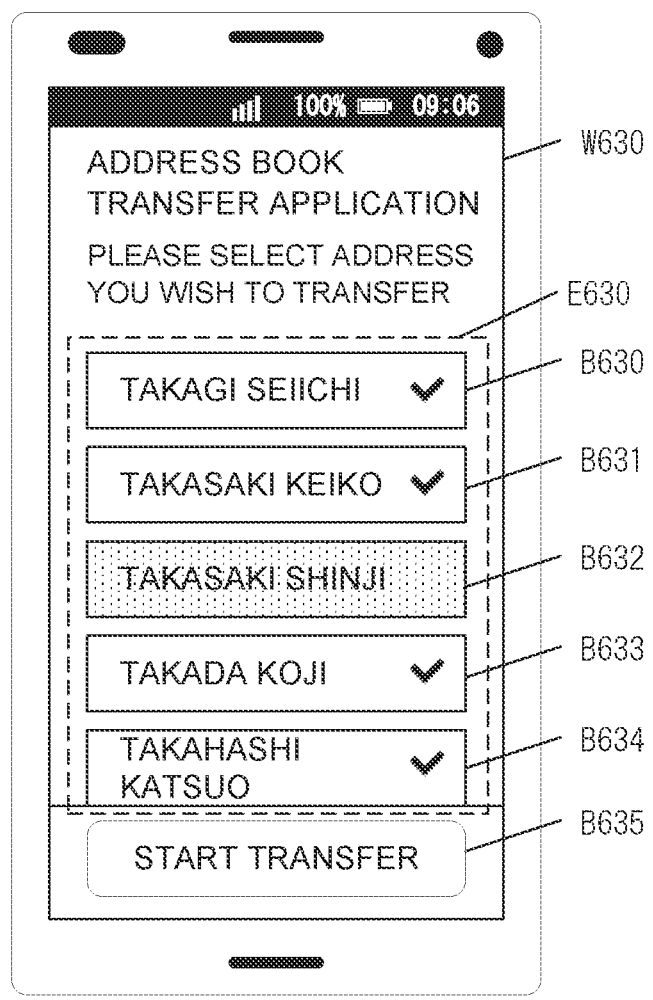
FIG. 25 is a diagram illustrating an operation example according to the sixth embodiment.

FIG. 25 is a diagram illustrating an example of a display screen W630 for selecting an address book to be transmitted. The display screen W630 is displayed on the displayer 240 of the terminal device 22. The display screen W630 includes an area E630 including a button indicating address book information stored in the address book information storage area 262. In the area E630, a button B630, a button B631, a button B632, a button B633, and a button B634 are included as buttons indicating address book information. By selecting a button included in the area E630, the user can specify whether the information is address book information to be transmitted to the image processing apparatus 10. For example, in FIG. 25, a fact that the information is address book information to be transmitted to the image processing apparatus 10 is indicated by displaying a checkmark to the right of the button. In this case, since a checkmark is not displayed on the button B632, address book information associated with the button B632 is not address book information to be transmitted to the image processing apparatus 10.

In addition, the display screen W630 includes a transfer start button B635 for starting transmission (transfer) of address book information. By selecting the transfer start button B635, the user can transmit, to the image processing apparatus 10, address book information specified as a transmission target in the area E630.

Figure 26:
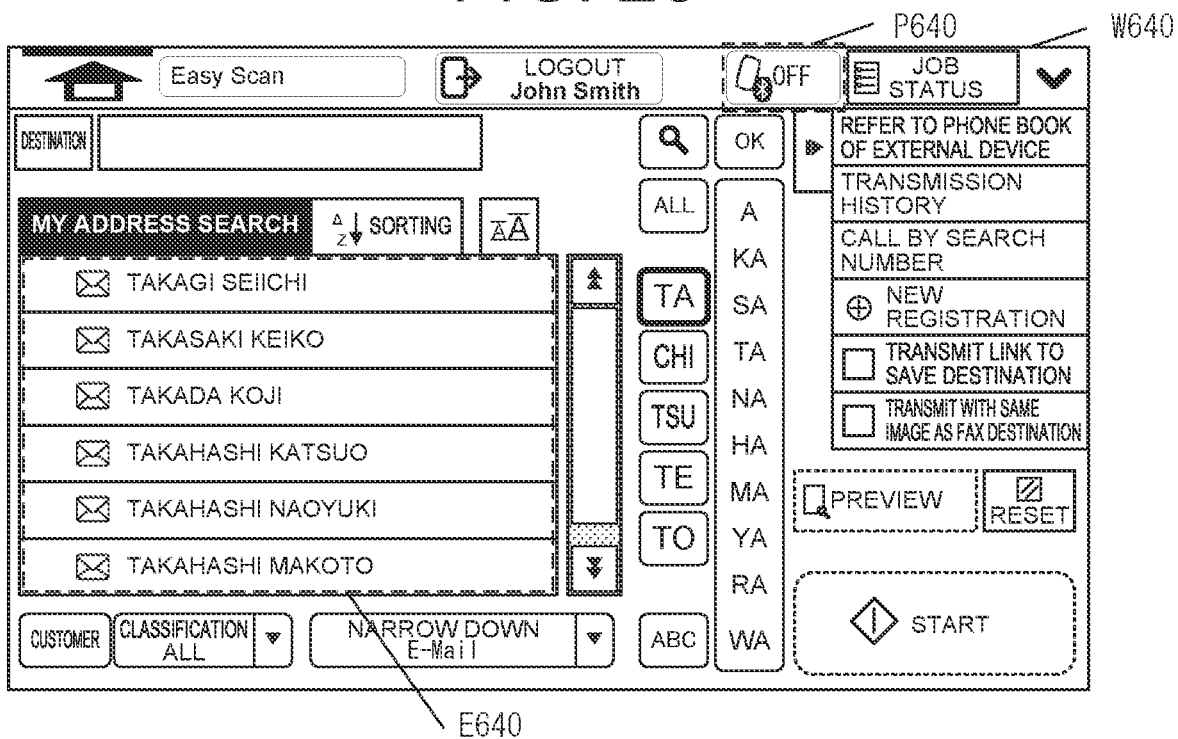
FIG. 26 is a diagram illustrating an operation example according to the sixth embodiment.

FIG. 26 is a diagram illustrating an example of a display screen W640 (transmission destination selection screen) to be displayed on the displayer 140 after address book information is transmitted (transferred) from the terminal device 22. At this point of time, the image processing apparatus 10 shifts to a transmission destination selection mode. The display screen W640 includes an area E640 in which address book information transmitted (transferred) from the terminal device 22 is displayed. The user can select, from the area E640, a user (address) to which an image is transmitted.

Note that, in the present embodiment, when the image processing apparatus 10 receives address book information from the terminal device 22, and shifts to a transmission destination selection mode, pairing with the terminal device 22 is released. Therefore, an OFF icon P640 indicating that pairing with the terminal device 22 has been released is displayed on the display screen W640.

The above-described description is made based on a premise that pairing is performed between the image processing apparatus 10 and the terminal device 22 by selecting a "mobile address book" button displayed on the image processing apparatus 10, and a mobile address book is transferred. However, transferring a mobile address book may be started by the terminal device 22. Specifically, in a case where the terminal device 22 has a dedicated application for transferring a mobile address book to the image processing apparatus 10, a trigger for transferring a mobile address book may be pulled from the terminal device 22 side.

For example, a communication application performs processing in S608 and S610 in FIG. 22, and when the image processing apparatus 10 is selected by the user, a signal or information indicating that transfer of a mobile address book is started is transmitted from the terminal device 22 to the image processing apparatus 10. The signal is transmitted, for example, from the terminal device 22 to the image processing apparatus 10 via Wi-Fi (LAN). Upon receiving a signal or information indicating that transfer of a mobile address book is started, the image processing apparatus 10 establishes communication with the terminal device 22 by performing pairing with the terminal device 22 at the point of time without performing processing in S602 and S604 in FIG. 22, and receives address book information from the terminal device 22.

In this way, according to the present embodiment, address book information can be transmitted to the image processing apparatus via an application to be executed by the terminal device. Also, since the image processing apparatus releases pairing with the terminal device after receiving address book information from the terminal device, it is possible to prevent address book information from being acquired by other users through the terminal device by operating the image forming apparatus against the user's intention.

7. Modification Example

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

In addition, although some parts of the above-described embodiments are separately described for convenience of explanation, it is needless to say that it is possible to combine and implement the embodiments within a technically allowable range. For example, the second embodiment and the seventh embodiment may be combined and implemented. In this case, the terminal device can transmit address book information to the image processing apparatus by using a communication application. On the other hand, the image processing apparatus maintains a pairing state with the terminal device until a transmission destination based on address book information acquired from the terminal device is selected. Therefore, even when the user performs an operation of transmitting address book information from the terminal device to the image processing apparatus a number of times, the user does not need to perform pairing between the image processing apparatus and the terminal device each time the operation is performed.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) Disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

Further, the above-described embodiments have been described based on a premise that, as an example, communication between the image processing apparatus 10 and the terminal device 20 is mainly performed by Bluetooth as an example of near field communication. For example, the image processing apparatus 10 and the terminal device 20 may be connected by a wireless LAN. In this case, connection information concerning a wireless LAN (e.g., SSID, a connection password, a connection ID, and the like) may be used as connection information. Also, in a case of a wireless LAN, communication with the image processing apparatus 10 or the terminal device 20 may be performed by an application that performs communication, or an access point function may be provided in any of the devices.

Further, the above-described embodiments have been made based on a premise that the image processing apparatus includes a displayer, but the displayer may be configured of a display device of an apparatus other than the image processing apparatus. In this case, a controller of the image processing apparatus causes the display device to display a predetermined screen, or controls to display an ON icon or an OFF icon.

Further, the above-described embodiments have been made based on a premise that a timing at which pairing with the terminal device is released is: when acquisition of address book information from the terminal device is completed; when a transmission destination based on address book information acquired from the terminal device is selected; when a transmission destination is determined; and when processing of transmitting an image is completed. However, pairing between the image processing apparatus and the terminal device may be released at a timing other than the above-described timings. Specifically, the image processing apparatus may release pairing with the terminal device at any timing after acquiring, from the terminal device, address book information, which is information on a transmission destination, and before processing of transmitting an image to the transmission destination via a communicator is completed.

Further, the above-described embodiments have been made based on a premise that information to be acquired from the terminal device by the image processing apparatus is address book information, but information to be acquired from the terminal device may be information other than address book information. For example, information to be acquired from the terminal device may be image data, document data, or the like, which are a content to be output. Also in this case, the image processing apparatus may release pairing with the terminal device after acquiring information from the terminal device.

What is claimed is:

1. An image processing apparatus comprising:
a communicator that performs wireless communication with a terminal device; and a controller, wherein
the controller
performs pairing with the terminal device,
establishes wireless communication with the paired terminal device via the communicator,
acquires information on a transmission destination of an image from the terminal device,
disconnects the wireless communication after acquiring the information on the transmission destination,
releases the pairing with the terminal device by disconnecting the wireless communication, and
when acquisition of the information on the transmission destination is interrupted, the controller releases the pairing with the terminal device.

2. The image processing apparatus according to claim 1, wherein
the controller releases the pairing at any timing after acquiring the information on the transmission destination and before processing of transmitting the image to the transmission destination is completed.

3. The image processing apparatus according to claim 2, wherein
the controller releases the pairing with the terminal device at any of the following timings: when acquisition of the information on the transmission destination is completed, when the transmission destination is determined, and when processing of transmitting the image is completed.

4. The image processing apparatus according to claim 1, wherein
in a case where the controller shifts to a mode different from a mode for allowing a user to select the transmission destination, the controller releases the pairing with the terminal device.

5. The image processing apparatus according to claim 1, further comprising a storage, wherein
the controller stores, in the storage, information to be used for communicating with the terminal device by performing the pairing with the terminal device, and releases the pairing with the terminal device by deleting, from the storage, the information to be used for communicating with the terminal device.

6. An image processing apparatus comprising:
a communicator that performs wireless communication with a terminal device; and a controller, wherein
the controller
performs pairing with the terminal device,
establishes wireless communication with the paired terminal device via the communicator,
acquires information on a transmission destination of an image from the terminal device,
disconnects the wireless communication after acquiring the information on the transmission destination, and
releases the pairing with the terminal device by disconnecting the wireless communication, wherein
in a case where the pairing with the terminal device is performed, the controller controls to display a first identification indication, and
in a case where the pairing with the terminal device is released, the controller controls to display a second identification indication different from the first identification indication.

7. The image processing apparatus according to claim 6, wherein
when the first identification indication is selected by a user, the controller releases the pairing with the terminal device.

8. The image processing apparatus according to claim 6, wherein
the controller releases the pairing at any timing after acquiring the information on the transmission destination and before processing of transmitting the image to the transmission destination is completed.

9. The image processing apparatus according to claim 8, wherein
the controller releases the pairing with the terminal device at any of the following timings: when acquisition of the information on the transmission destination is completed, when the transmission destination is determined, and when processing of transmitting the image is completed.

10. The image processing apparatus according to claim 6, wherein
in a case where the controller shifts to a mode different from a mode for allowing a user to select the transmission destination, the controller releases the pairing with the terminal device.

11. The image processing apparatus according to claim 6, further comprising a storage, wherein
the controller stores, in the storage, information to be used for communicating with the terminal device by performing the pairing with the terminal device, and releases the pairing with the terminal device by deleting, from the storage, the information to be used for communicating with the terminal device.

12. A control method for an image processing apparatus, comprising:
pairing with a terminal device;
establishing wireless communication with the paired terminal device;
acquiring information on a transmission destination of an image from the terminal device;

disconnecting the wireless communication after acquiring the information on the transmission destination;

releasing the pairing with the terminal device by disconnecting the wireless communication; and releasing the pairing with the terminal device when acquisition of the information on the transmission destination is interrupted.

13. A control method for an image processing apparatus, comprising:

pairing with a terminal device;

establishing wireless communication with the paired terminal device;

acquiring information on a transmission destination of an image from the terminal device;

disconnecting the wireless communication after acquiring the information on the transmission destination;

releasing the pairing with the terminal device by disconnecting the wireless communication;

displaying a first identification indication in a case where the pairing with the terminal device is performed; and displaying a second identification indication different from the first identification indication in a case where the pairing with the terminal device is released.

* * * * *